(12) United States Patent
Swartz et al.

(10) Patent No.: US 11,370,166 B2
(45) Date of Patent: Jun. 28, 2022

(54) METHODS AND APPARATUS FOR THREE-DIMENSIONAL PRINTED COMPOSITES BASED ON FOLDED SUBSTRATE SHEETS

(71) Applicant: Impossible Objects Inc., Northbrook, IL (US)

(72) Inventors: Robert Swartz, Highland Park, IL (US); Eugene Gore, Des Plaines, IL (US); Buckley Crist, Wilmette, IL (US)

(73) Assignee: Impossible Objects, Inc., Northbrook, IL (US)

( * ) Notice: Subject to any disclaimer, the term of this patent is extended or adjusted under 35 U.S.C. 154(b) by 126 days.

(21) Appl. No.: 16/711,313

(22) Filed: Dec. 11, 2019

(65) Prior Publication Data

US 2020/0223131 A1   Jul. 16, 2020

Related U.S. Application Data

(63) Continuation of application No. 15/298,188, filed on Oct. 19, 2016, now abandoned, which is a
(Continued)

(51) Int. Cl.
*B29C 64/147* (2017.01)
*B29C 65/48* (2006.01)
(Continued)

(52) U.S. Cl.
CPC .......... *B29C 64/147* (2017.08); *B29C 64/141* (2017.08); *B29C 64/153* (2017.08);
(Continued)

(58) Field of Classification Search
CPC .............................. B29C 64/20; B29C 64/153
See application file for complete search history.

(56) References Cited

U.S. PATENT DOCUMENTS

| 3,431,166 A | 3/1969 | Mizutani |
| 4,312,268 A | 1/1982 | King et al. |

(Continued)

FOREIGN PATENT DOCUMENTS

| CN | 101181776 A | 5/2008 |
| CN | 201329424 Y | 10/2009 |

(Continued)

OTHER PUBLICATIONS

International Search Report for PCT/US12/52946 ("Methods and Apparatus for 3D Fabrication"), dated Jan. 10, 2013.

(Continued)

*Primary Examiner* — Christopher T Schatz

(74) *Attorney, Agent, or Firm* — Dunlap Bennett & Ludwig, PLLC

(57) ABSTRACT

A three-dimensional object comprises substantially planar or flat substrate layers that are folded and stacked in a predetermined order and infiltrated by a hardened material. The object is fabricated by positioning powder on all or part of multiple substrate layers. On each layer, the powder is selectively deposited in a pattern that corresponds to tiles that each have a slice of the object. For each slice, powder is deposited in positions that correspond to positions in the slice where the object exists, and not deposited where the object does not exist. The tiles of each substrate layer are folded and aligned in a predetermined order. Multiple folded substrate layers mat be combined into a single stack. The powder is transformed into a substance that flows and subsequently hardens into the hardened material in a spatial pattern that infiltrates positive regions, and does not infiltrate negative regions, in the substrate layers.

12 Claims, 20 Drawing Sheets

Related U.S. Application Data continuation-in-part of application No. 14/835,685, filed on Aug. 25, 2015, which is a continuation-in-part of application No. 13/582,939, filed on Nov. 2, 2012, now Pat. No. 9,827,754, said application No. 15/298,188 is a continuation-in-part of application No. 14/835,690, filed on Aug. 25, 2015, now Pat. No. 9,833,949, which is a continuation-in-part of application No. 13/582,939, filed on Nov. 2, 2012, now Pat. No. 9,827,754, said application No. 15/298,188 is a continuation-in-part of application No. 13/582,939, filed on Nov. 2, 2012, now Pat. No. 9,827,754.

(60) Provisional application No. 61/528,537, filed on Aug. 29, 2011.

(51) Int. Cl.

| | | |
|---|---|---|
| *B32B 5/22* | (2006.01) | |
| *G03G 15/22* | (2006.01) | |
| *B32B 5/02* | (2006.01) | |
| *B32B 7/14* | (2006.01) | |
| *B32B 5/26* | (2006.01) | |
| *B32B 5/30* | (2006.01) | |
| *B29C 64/153* | (2017.01) | |
| *B32B 9/04* | (2006.01) | |
| *B32B 27/36* | (2006.01) | |
| *B32B 29/00* | (2006.01) | |
| *B32B 9/06* | (2006.01) | |
| *B32B 27/14* | (2006.01) | |
| *B32B 29/02* | (2006.01) | |
| *B32B 27/08* | (2006.01) | |
| *B32B 27/10* | (2006.01) | |
| *B32B 5/16* | (2006.01) | |
| *B32B 29/04* | (2006.01) | |
| *B32B 27/06* | (2006.01) | |
| *B32B 18/00* | (2006.01) | |
| *B32B 27/12* | (2006.01) | |
| *B32B 5/12* | (2006.01) | |
| *B32B 9/00* | (2006.01) | |
| *B29C 64/30* | (2017.01) | |
| *B29C 64/20* | (2017.01) | |
| *B29C 64/141* | (2017.01) | |
| *B29K 101/12* | (2006.01) | |
| *B29K 105/00* | (2006.01) | |
| *B33Y 40/00* | (2020.01) | |
| *B33Y 10/00* | (2015.01) | |

(52) U.S. Cl.
CPC ........... *B29C 64/20* (2017.08); *B29C 64/30* (2017.08); *B29C 65/486* (2013.01); *B32B 5/02* (2013.01); *B32B 5/022* (2013.01); *B32B 5/024* (2013.01); *B32B 5/12* (2013.01); *B32B 5/16* (2013.01); *B32B 5/22* (2013.01); *B32B 5/26* (2013.01); *B32B 5/30* (2013.01); *B32B 7/14* (2013.01); *B32B 9/005* (2013.01); *B32B 9/045* (2013.01); *B32B 9/047* (2013.01); *B32B 9/048* (2013.01); *B32B 9/06* (2013.01); *B32B 18/00* (2013.01); *B32B 27/06* (2013.01); *B32B 27/08* (2013.01); *B32B 27/10* (2013.01); *B32B 27/12* (2013.01); *B32B 27/14* (2013.01); *B32B 27/36* (2013.01); *B32B 29/002* (2013.01); *B32B 29/005* (2013.01); *B32B 29/02* (2013.01); *B32B 29/04* (2013.01); *G03G 15/224* (2013.01); *B29K 2101/12* (2013.01); *B29K 2105/0097* (2013.01); *B29K 2105/251* (2013.01); *B29K 2105/256* (2013.01); *B32B 2250/20* (2013.01); *B32B 2250/24* (2013.01); *B32B 2250/26* (2013.01); *B32B 2255/02* (2013.01); *B32B 2255/04* (2013.01); *B32B 2255/10* (2013.01); *B32B 2255/12* (2013.01); *B32B 2255/26* (2013.01); *B32B 2260/021* (2013.01); *B32B 2260/023* (2013.01); *B32B 2260/025* (2013.01); *B32B 2260/028* (2013.01); *B32B 2260/04* (2013.01); *B32B 2260/046* (2013.01); *B32B 2262/02* (2013.01); *B32B 2262/0261* (2013.01); *B32B 2262/0276* (2013.01); *B32B 2262/06* (2013.01); *B32B 2262/101* (2013.01); *B32B 2262/103* (2013.01); *B32B 2262/105* (2013.01); *B32B 2262/106* (2013.01); *B32B 2307/202* (2013.01); *B32B 2307/50* (2013.01); *B32B 2307/718* (2013.01); *B32B 2307/726* (2013.01); *B32B 2307/75* (2013.01); *B32B 2605/08* (2013.01); *B32B 2607/00* (2013.01); *B33Y 10/00* (2014.12); *B33Y 40/00* (2014.12); *Y10T 428/2481* (2015.01); *Y10T 428/24826* (2015.01); *Y10T 428/24843* (2015.01)

(56) References Cited

U.S. PATENT DOCUMENTS

| | | |
|---|---|---|
| 4,393,389 A | 7/1983 | Rasekhi et al. |
| 4,453,694 A | 6/1984 | Andreasson |
| 4,863,538 A | 9/1989 | Deckard |
| 5,176,949 A | 1/1993 | Allagnat et al. |
| 5,204,055 A | 4/1993 | Sachs et al. |
| 5,260,009 A | 11/1993 | Penn |
| 5,340,656 A | 8/1994 | Sachs et al. |
| 5,364,657 A | 11/1994 | Throne |
| 5,369,192 A | 11/1994 | Ko et al. |
| 5,514,232 A | 5/1996 | Burns |
| 5,637,175 A | 6/1997 | Feygin et al. |
| 5,876,550 A | 3/1999 | Feygin et al. |
| 5,988,959 A | 11/1999 | Sugata |
| 6,147,138 A | 11/2000 | Hochsmann et al. |
| 6,161,995 A | 12/2000 | Wakazono et al. |
| 6,471,800 B2 | 10/2002 | Jang et al. |
| 6,551,038 B1 | 4/2003 | Sugata et al. |
| 6,596,224 B1 | 7/2003 | Sachs et al. |
| 6,632,054 B2 | 10/2003 | Geiger et al. |
| 6,740,185 B2 | 5/2004 | Baldwin |
| 6,780,368 B2 | 8/2004 | Liu et al. |
| 8,377,547 B2 | 2/2013 | Noguchi et al. |
| 2002/0104935 A1 | 8/2002 | Schweizer |
| 2004/0070582 A1 | 4/2004 | Smith et al. |
| 2004/0112523 A1 | 6/2004 | Crom et al. |
| 2005/0059757 A1 | 3/2005 | Bredt et al. |
| 2006/0061618 A1 | 3/2006 | Hernandez et al. |
| 2007/0241482 A1 | 10/2007 | Giller et al. |
| 2008/0006958 A1 | 1/2008 | Davidson |
| 2008/0260954 A1 | 10/2008 | Paton et al. |
| 2009/0255428 A1 | 10/2009 | Stiel |
| 2009/0321979 A1 | 12/2009 | Hiraide |
| 2010/0200156 A1 | 8/2010 | Lengsfeld ............ B29C 70/462 156/226 |
| 2010/0260955 A1 | 10/2010 | Hasegawa ............ A63B 53/10 428/36.3 |
| 2010/0302326 A1 | 12/2010 | Morohoshi et al. |
| 2011/0045724 A1 | 2/2011 | Bahukudumbi |
| 2011/0101564 A1 | 5/2011 | Keenihan et al. |
| 2011/0121491 A1 | 5/2011 | Costabeber |
| 2012/0059503 A1 | 3/2012 | Pax et al. |
| 2012/0308766 A1* | 12/2012 | Kweder ............... B29C 70/345 428/113 |
| 2013/0171431 A1 | 7/2013 | Swartz et al. |
| 2014/0238173 A1 | 8/2014 | Swartz et al. |
| 2014/0257549 A1 | 9/2014 | Swartz et al. |
| 2015/0137423 A1 | 5/2015 | Ding |
| 2015/0158246 A1 | 6/2015 | Swartz et al. |

(56) References Cited

U.S. PATENT DOCUMENTS

| | | | |
|---|---|---|---|
| 2015/0231825 A1 | 8/2015 | Swartz et al. |
| 2016/0082657 A1 | 3/2016 | Swartz et al. |
| 2016/0082658 A1 | 3/2016 | Swartz et al. |
| 2016/0082695 A1 | 3/2016 | Swartz et al. |
| 2016/0339645 A1 | 11/2016 | Swartz et al. |

FOREIGN PATENT DOCUMENTS

| | | |
|---|---|---|
| CN | 104150915 A | 11/2014 |
| EP | 2776233 A2 | 9/2014 |
| EP | 2961585 A2 | 1/2016 |
| JP | H11236451 | 8/1999 |
| WO | WO-2007114895 A2 | 10/2007 |
| WO | WO-2013010108 A1 | 1/2013 |
| WO | WO-2013033273 A2 | 3/2013 |
| WO | WO-2014134224 A2 | 9/2014 |

OTHER PUBLICATIONS

J. Eltgen, A Short Review of Magnetography and Its Related Materials Problems, Ind. Eng. Chem. Prod. Res. Dev., vol. 24, No. 2, 1985, pp. 196-201.
Extended European Search Report, from EP Application No. 12828967 (EP20120828967) ("Methods and Apparatus for 3D Fabrication"), dated Jun. 9, 2015.
International Search Report for International Applicaton No. PCT/US14/18806 ("Methods and Apparatus for Three-Dimensional Printed Composites"), dated Aug. 5, 2014.
Invitation to Pay Additional Fees for International Applicaton No. PCT/US14/18806 ("Methods and Apparatus for Three-Dimensional Printed Composites"), dated May 6, 2014.
Decision on Protest for International Applicaton No. PCT/US14/18806 ("Methods and Apparatus for Three-Dimensional Printed Composites"), dated Jun. 19, 2014.
Restriction Requirement in U.S. Appl. No. 13/582,939 ("Methods and Apparatus for 3D Fabrication"), dated Sep. 30, 2015.
Non-Final Rejection in U.S. Appl. No. 13/582,939 ("Methods and Apparatus for 3D Fabrication"), dated Mar. 29, 2016.
Final Rejection in U.S. Appl. No. 13/582,939 ("Methods and Apparatus for 3D Fabrication"), dated Oct. 7, 2016.
Non-Final Rejection in U.S. Appl. No. 14/835,690 ("Apparatus for Fabricating Three-Dimensional Printed Composites"), dated Nov. 15, 2016.
Non-Final Rejection in U.S. Appl. No. 14/199,603 ("Methods and Apparatus for Photosculpture"), dated Apr. 12, 2016.
Restriction Requirement in U.S. Appl. No. 14/566,661 ("Tow Stabilization Method and Apparatus"), dated Dec. 9, 2016.
Restriction Requirement in U.S. Appl. No. 14/703,372 ("Methods and Apparatus for Three Dimensional Printed Composites Based on Flattened Substrate Sheets"), dated Jul. 25, 2016.
Non-Final Rejection in U.S. Appl. No. 14/703,372 ("Methods and Apparatus for Three Dimensional Printed Composites Based on Flattened Substrate Sheets"), dated Dec. 22, 2016.
International Search Report and Written Opinion in International Application No. PCT/US16/62319 ("Additive Manufacturing Method and Apparatus"), dated Jan. 23, 2017.
International Search Report and Written Opinion in International Application No. PCT/US16/62356 (". . . Metal Matrix Composites . . ."), dated Jan. 23, 2017.
Extended European Search Report in EP20140757160 ("Method and Apparatus for Three-Dimensional Printed Composites"), dated Jul. 4, 2016.
Restriction in U.S. Appl. No. 14/190,912 ("Methods and Apparatus for Construction of Machine Tools"), dated Dec. 1, 2015.
Restriction in U.S. Appl. No. 14/190,912 ("Methods and Apparatus for Construction of Machine Tools"), dated Jun. 24, 2016.
Non-Final Rejection in U.S. Appl. No. 14/190,912 ("Methods and Apparatus for Construction of Machine Tools"), dated Oct. 3, 2016.
Non-Final Rejection in U.S. Appl. No. 14/566,661 ("Tow Stabilization Method and Apparatus"), dated Mar. 21, 2017.
Applicant Initiated Interview Summary in U.S. Appl. No. 14/703,372 (". . . Flattened Substrate Sheets"), dated Feb. 9, 2017.
Invitation to Pay Additional Fees for International Application No. PCT/US17/17672 ("Method/Apparatus Automated Composite-Based Additive Manufacturing"), dated Apr. 17, 2017.
Non-Final Rejection in U.S. Appl. No. 13/582,939 ("Methods and Apparatus for 3D Fabrication"), dated Apr. 27, 2017.

\* cited by examiner

METHODS AND APPARATUS FOR THREE-DIMENSIONAL PRINTED COMPOSITES BASED ON FOLDED SUBSTRATE SHEETS

RELATED APPLICATIONS

This application claims the benefit of U.S. Provisional Application Ser. No. 62/243,590, filed Oct. 19, 2015, the entire disclosure of which is herein incorporated by reference.

This application is also a continuation-in-part of U.S. patent application Ser. No. 14/835,685, filed Aug. 25, 2015, the entire disclosure of which is herein incorporated by reference, which is a continuation of PCT International Application Ser. No. PCT/US2014/018806, filed Feb. 26, 2014, the entire disclosure of which is herein incorporated by reference, which claims the benefit of U.S. Provisional Application Ser. No. 61/769,724, filed Feb. 26, 2013, the entire disclosure of which is herein incorporated by reference. U.S. patent application Ser. No. 14/835,685 is also a continuation-in-part of U.S. patent application Ser. No. 13/582,939, filed Aug. 29, 2012, the entire disclosure of which is herein incorporated by reference, which claims the benefit of U.S. Provisional Application Ser. No. 61/528,537, filed Aug. 29, 2011, the entire disclosure of which is herein incorporated by reference.

This application is also a continuation-in-part of U.S. patent application Ser. No. 14/835,690, filed Aug. 25, 2015, the entire disclosure of which is herein incorporated by reference, which is a divisional of PCT International Application Ser. No. PCT/US2014/018806, filed Feb. 26, 2014, the entire disclosure of which is herein incorporated by reference, which claims the benefit of U.S. Provisional Application Ser. No. 61/769,724, filed Feb. 26, 2013, the entire disclosure of which is herein incorporated by reference. U.S. patent application Ser. No. 14/835,690 is also a continuation-in-part of U.S. patent application Ser. No. 13/582,939, filed Aug. 29, 2012, the entire disclosure of which is herein incorporated by reference, which claims the benefit of U.S. Provisional Application Ser. No. 61/528,537, filed Aug. 29, 2011, the entire disclosure of which is herein incorporated by reference.

This application is also a continuation-in-part of U.S. patent application Ser. No. 13/582,939, filed Aug. 29, 2012, the entire disclosure of which is herein incorporated by reference, which claims the benefit of U.S. Provisional Application Ser. No. 61/528,537, filed Aug. 29, 2011, the entire disclosure of which is herein incorporated by reference.

FIELD OF THE TECHNOLOGY

The present invention relates to three-dimensional fabrication.

BACKGROUND

Three dimensional printing can be seen as largely a materials problem. One of the limitations of current methods is a limited materials palette and slow build speeds.

These and other limitations of the prior art are avoided by a methodology known as Composite-Based Additive Manufacturing (CBAM). CBAM is described in full in co-pending U.S. patent application Ser. No. 13/582,939, filed Nov. 2, 2012, Ser. No. 14/835,690, filed Aug. 25, 2015, and Ser. No. 14/835,685, filed Aug. 25, 2015, each of which are incorporated fully herein by reference.

SUMMARY

In exemplary implementations, this invention comprises methods and apparatus for fabricating a 3D object. The object is made, at least in part, of a layered composite material. For example, the composite material may comprise carbon fiber substrate layers joined by a hardened thermoplastic or thermoset.

In exemplary implementations of this invention, a 3D object is formed layer by layer, as follows: Thermoplastic powder (or thermosettable plastic powder) is selectively deposited on one layer of substrate, then on a second layer of substrate, then on a third, and so on.

The powder may comprise polyethylene and the substrate layers may comprise woven or nonwoven sheets of polylactic acid (PLA). However, a variety of materials may be used for the powder and substrate, respectively, and the substrate need not be either woven or fibrous. In a preferred embodiment, the substrate is carbon fiber or other similar materials that will be apparent to one of skill in the art of the invention.

In some implementations of this invention, in order to produce the 3D object, thermoplastic powder is selectively applied to some, but not all, regions of each carbon fiber substrate layer, respectively. The powder is then melted. The molten material infiltrates or coats at least some regions of the layers, cools and hardens. The hardened material connects or fuses together the substrate layers.

A computer processor may control the selective deposition of the powder, based on a CAD model of the 3D object. The CAD model is divided into thin sections or "slices". On each substrate layer, the powder is deposited only in some areas, and not in others. The pattern in which the powder is selectively deposited on each substrate layer, respectively, corresponds to a positive image of one of the slices. That is, for each slice of the 3D object: (a) powder is deposited in positions that correspond to positions in the slice where the 3D object exists, and (b) powder is not deposited in positions that correspond to positions in the slice where the 3D object does not exist.

In other implementations of this invention, thermoplastic powder is deposited in an unselective manner (flooded) onto the substrate layers. Then the flooded powder is selectively melted (e.g., melted in some but not all areas).

To build up the 3D object layer by layer, the substrate layers are aligned with each other and placed one on top of one another. Alignment of the substrate layers may include folding a single substrate layer onto itself one or more times, which may be in accordance with a predetermined order for creating the three-dimensional object. When multiple folded substrate layers are used, the folded layer stacks are aligned with each other and placed one on top of one another. This may also be in accordance with a predetermined order for creating the three-dimensional object Heat is applied (or heat and pressure are applied) to the powder and substrate, causing the powder, not the substrate, to melt. The resulting molten material coats the substrate. The molten material then cools and solidifies. The solidified material holds adjacent layers of substrate together. For example, the solidified material may bridge between different layers of the substrate. In this manner, a part of each layer of substrate is coated by this solidified material. In some implementations, heat and pressure are applied once per layer. In other implementations, they are applied less frequently (e.g., once every two layers, or less frequently).

In exemplary implementations of this invention, once the thermoplastic plastic has hardened, part of each substrate layer has been infiltrated or coated by the hardened material and another part (the "excess region") of each substrate layer has not been infiltrated or coated by the hardened material. The excess region of each layer (which was not infiltrated by the hardened material, e.g. the hardened thermoplastic) is then removed.

At least once in the process (e.g., at the end of the process), excess substrate is removed. The excess substrate is that portion of each substrate layer that is not coated by the solidified material. In exemplary implementations of this invention, the excess region may be removed, at least partially, by non-mechanical means, e.g., by dissolution or chemical degradation. Removal of the excess substrate may be accomplished, for example, by dissolution or polymer degradation. In those cases, the solvent or degrading agent employed depends on the substrate material that is employed. For example, if the substrate comprises PLA fabric, then potassium hydroxide in methanol may be used to dissolve the excess (uncoated) portion of each substrate layer. Or, for example, if the substrate comprises polyvinyl alcohol (PVOH) fabric, then water may be used to dissolve the excess substrate.

The excess region may also be removed by mechanical means, such as, but not limited to, abrasion, including abrasive blasting. For example, in a prototype of this invention, the excess region is removed by glass bead blasting. As used herein, the term "abrasion" includes abrasive blasting.

In exemplary implementations of this invention, a broad range of abrasive blasting techniques and materials may be employed for the purpose of removing the excess region. For example, the abrasive material used in the abrasive blasting may comprise, but is not limited to, any one or more of the following: garnet, glass beads, glass grit, aluminum oxide, silicon carbide, carborundum, ceramic shot, ceramic grit, steel shot, steel grit, cut wire, copper shot, aluminum shot, zinc shot, other metallic abrasives, copper slag, nickel slag, magnesium sulfate, kieserite, staurolite, sodium bicarbonate, dry ice, plastic abrasive, or crushed nut shells. Also, for example, the abrasive medium may be propelled by a pressurized fluid (e.g., air or water) or by a moving object (e.g., a rotating wheel).

The abrasion methods and apparatus used to remove the excess region are not limited to abrasive blasting. In illustrative implementations of this invention, other methods and apparatus for abrasion may be used, including, but not limited to, bristle blasting, rotary brushes, wire brush, sandpaper, emery paper, belt sanders, or files.

In exemplary implementations of this invention, the excess region may be removed in other mechanical ways, besides abrasion. For example, saws, drill bits, burrs, awls, scrapers, dental tools (e.g., periodontal scalers or periodontal curettes), thread, and abrasive thread may be employed for this purpose.

The desired 3D object is defined by that portion of layers where the powder has been selectively deposited and melted (i.e., that portion which is coated by the solidified material once the melted powder cools and solidifies).

Alternatively, in some implementations, no powder is used. Instead, for example, a liquid (e.g., a liquid thermoplastic or liquid thermosetting polymer) may be selectively deposited on a layer of substrate. The substrate layer may comprise carbon fiber. The liquid may comprise, for example, an epoxy resin, UV curable resin or acrylic resin. The liquid may infiltrate or coat the substrate layers, and then harden or cure, fusing together layers of substrate. The excess portion of the substrate layer (which has not been infiltrated or coated by the liquid) may be removed, as described above. A composite material may be fabricated, layer by layer, in this manner. For example, the composite material may include carbon fiber.

The entire process (or parts of the process) may be automated and computer controlled. For example, one or more of the following may be automated and computer controlled: the selective deposition of powder, removal of excess powder, feeding of substrate sheets, heating and pressing, and removal of excess substrate.

The 3D object that is printed comprises a composite material (the solidified plastic and the substrate that it coats). In one aspect, a three-dimensional article of manufacture according to the invention comprises a plurality of substrate layers that are folded and stacked in a predetermined order for creating the article and are infiltrated or coated by, and bound together by, a hardened material, wherein each substrate layer is a sheet-like structure that is substantially planar or flat and is made from materials that can be abraded, abrasively blasted, or chemically removed. In some embodiments, the substrate layer materials may comprise carbon fibers, ceramic fibers, polymer fibers, glass fibers, and/or metal fibers.

This invention has numerous advantages over existing technology. Among other things, in exemplary embodiments: First, it can be used with a wide variety of materials for the powder, substrate and solvent or degrading agent. Second, it produces composite materials, and thus can print 3D objects with highly desirable material properties, such as high strength and low weight. Third, it can fabricate objects at a very rapid pace, in some implementations. Fourth, it can also produce much larger objects than present technology and the parts can be colored or decorated.

In particular exemplary implementations, the invention can use carbon fiber (together with other materials) to fabricate composite parts that are strong, light and have better performance than metals in many respects. The composite materials that are produced have material properties that are better than many homogenous materials. Since the process can use conventional thermal inkjet heads, the cost of the mechanism is substantially reduced and the process is much faster than existing 3D printing methods.

The above description of the present invention is just a summary. It is intended only to give a general introduction to some illustrative implementations of this invention. It does not describe all of the details of this invention. This invention may be implemented in many other ways, including with thermosettable powder.

BRIEF DESCRIPTION OF THE DRAWINGS

Other aspects, advantages and novel features of the invention will become more apparent from the following detailed description of the invention when considered in conjunction with the accompanying drawings wherein:

FIG. 7A shows a pattern that has been inkjet-printed on a substrate layer. The pattern comprises a 4×3 matrix. In each tile of the matrix, respectively, a different cross-sectional "slice" of the ring torus has been printed by the inkjet printer.

FIG. 7B depicts a substrate layer similar to that of FIG. 7A, with the grid defined by laser cut perforations at the grid lines.

FIG. 7C depicts the substrate layer of FIG. 7B, with some of the grid lines cut to enable folding.

FIG. 7D depicts the substrate layer of FIGS. 7B and 7C, folded to stack the tiles in the correct order.

FIG. 11 shows the exemplary ring torus that remains after excess substrate in the rectangular cuboid of FIG. 10 has been removed.

The above Figures show all or part of illustrative embodiments of this invention, or of products of those embodiments, but may not show all of the details of individual embodiments of the invention.

DETAILED DESCRIPTION

In exemplary implementations of this invention, a 3D object is formed layer by layer. Powder is selectively deposited on each layer. The powder is melted, so that it coats a portion of the substrate layer. The melted powder then solidifies, bonding the layers of substrate together. The excess substrate that is not coated by the solidified material is subsequently removed. In a preferred embodiment, the substrate is carbon fiber and the excess substrate is removed by abrasion.

Figure 1A:
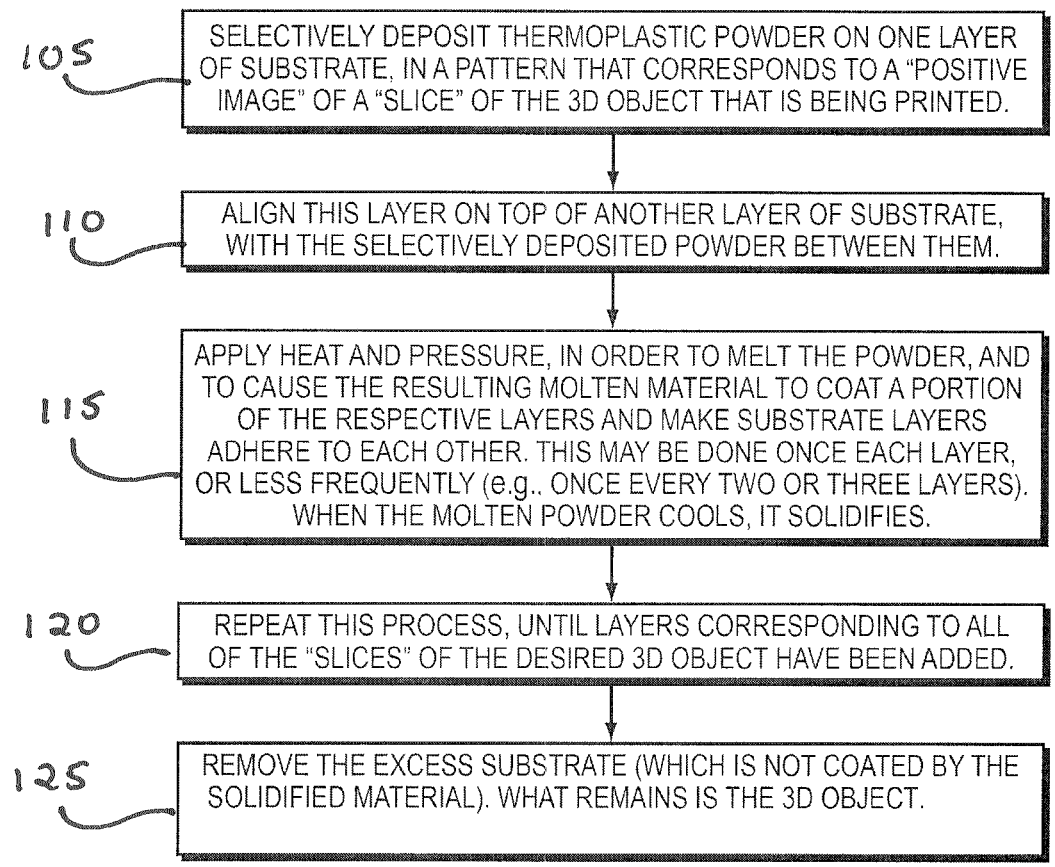
FIG. 1A is a high-level flow chart of steps used to manufacture a 3D object, in an exemplary embodiment of this invention.
Figure 1B:
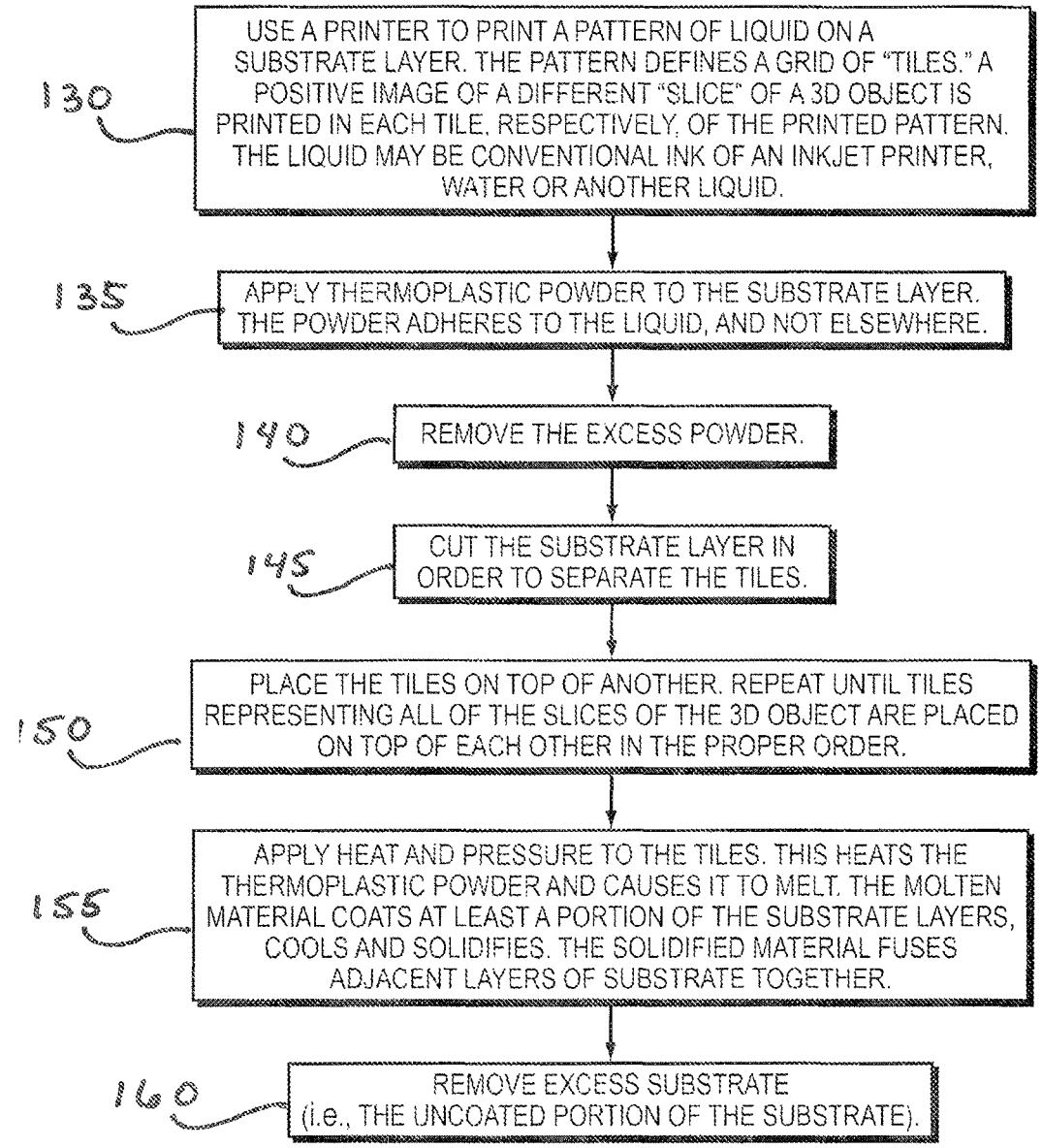
FIG. 1B is a high-level flow chart of steps used to manufacture a 3D object, in another exemplary embodiment of this invention.
Figure 1C:
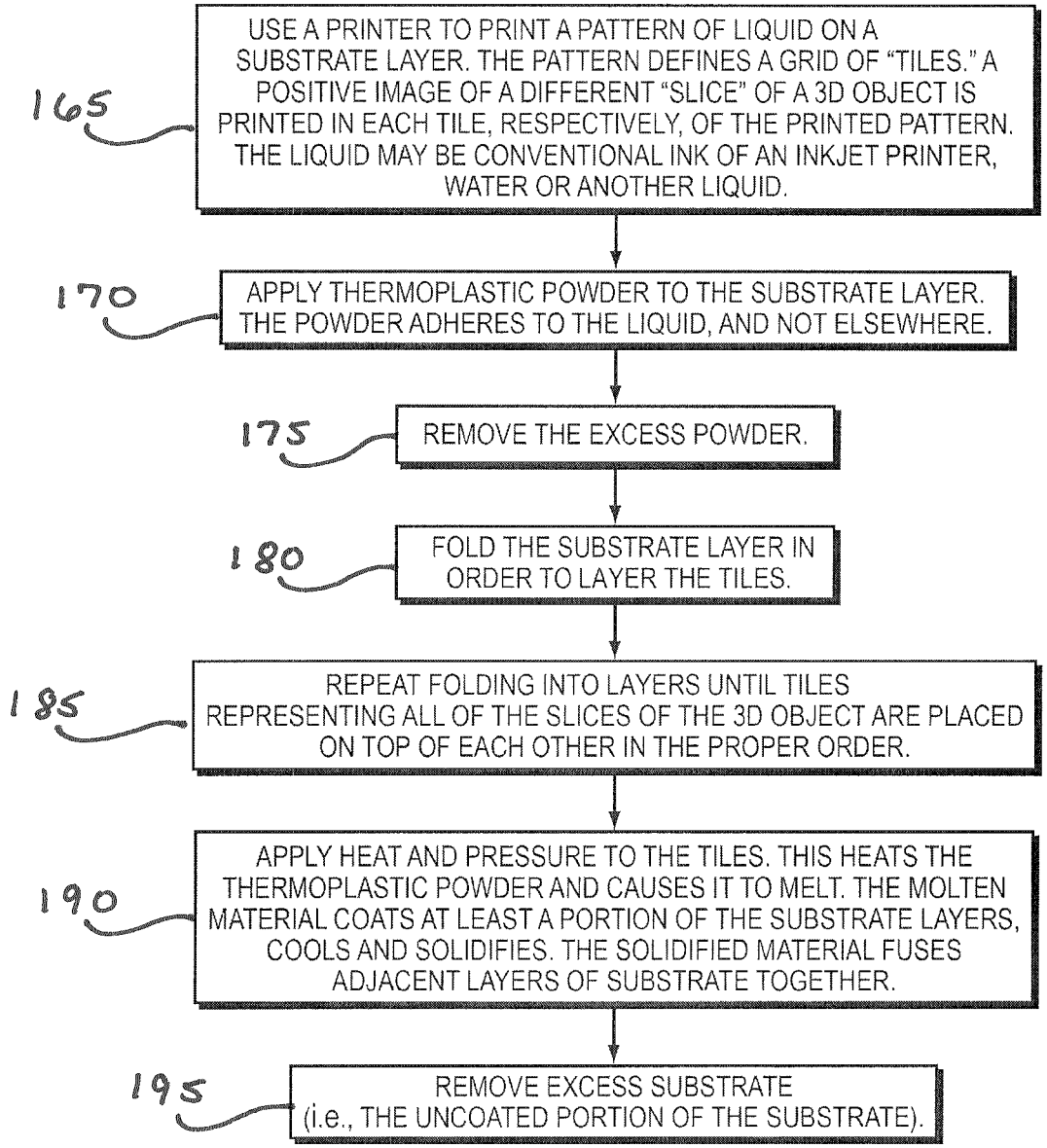
FIG. 1C is a high-level flow chart of steps used to manufacture a 3D object, in another exemplary embodiment of this invention.

FIGS. 1A-1C are each flow charts of steps used to manufacture a 3D object according to three illustrative embodiments of this invention, respectively.

In the embodiment shown in FIG. 1A, thermoplastic powder is selectively deposited 105 on one layer of substrate, in a pattern that corresponds to a "positive image" of a "slice" of the 3D object that is being printed. This layer is aligned 110 on top of another layer of substrate, with the selectively deposited powder between them. Heat and pressure are applied 115 in order to melt the powder and cause the resulting molten material to coat a portion of the respective layers and make the substrate layers adhere to each other. This may be done once each layer, or less frequently (e.g., once every two or three layers). When the molten powder cools, it solidifies. This process is repeated 120 until layers corresponding to all of the "slices" of the desired 3D object have been added. The excess substrate (which is not coated by the solidified material) is then removed 125, leaving the 3D object.

In the alternate embodiment shown in FIG. 1B, a printer is used to print 130 a pattern of liquid on a substrate layer. The pattern defines a grid of "tiles." A positive image of a different "slice" of a 3D object is printed in each tile, respectively, of the printed pattern. The liquid may be conventional ink of an inkjet printer, water, or another liquid. Thermoplastic powder is applied 135 to the substrate layer. The powder adheres to the liquid, and not elsewhere. The excess powder is removed 140. The substrate layer is cut 145 in order to separate the tiles. The tiles are placed 150 on top of another. This is repeated until tiles representing all of the slices of the 3D object are placed on top of each other in the proper order. Heat and pressure are applied 155 to the tiles. This heats the thermoplastic powder and causes it to melt. The molten material coats at least a portion of the substrate layers, cools, and solidifies. The solidified material fuses adjacent layers of substrate together. Excess substrate (i.e., the uncoated portion of the substrate) is then removed 160.

In the alternate embodiment shown in FIG. 1C, a printer is used 165 to print a pattern of liquid on a substrate layer. The pattern defines a grid of "tiles." A positive image of a different "slice" of a 3D object is printed in each tile, respectively, of the printed pattern. The liquid may be conventional ink of an inkjet printer, water, or another liquid. Thermoplastic powder is applied 170 to the substrate layer. The powder adheres to the liquid and not elsewhere. The excess powder is removed 175. The substrate layer is folded 180 in order to layer the tiles. Folding into layers is repeated 185 until tiles representing all of the slices of the 3D object are placed on top of each other in the proper order. Heat and pressure is applied 190 to the tiles. This heats the thermoplastic powder and causes it to melt. The molten material coats at least a portion of the substrate layers, cools, and solidifies. The solidified material fuses adjacent layers of substrate together. Excess substrate (i.e., the uncoated portion of the substrate) is then removed 195, leaving the 3D object.

In illustrative implementations of this invention, the 3D object is printed in accordance with a computer 3D model of the object, created by a CAD program. For example, the CAD program may be a free-form NURBS (non-uniform rational basis spline) program, such as Rhinoceros® (available from McNeel North America, Seattle, Wash.), or, for example, the CAD program may be SolidWorks® (available from Dassault Systèmes SolidWorks Corp., Concord, Mass.).

On each substrate layer, powder is selectively deposited in a physical pattern that corresponds to a "positive image" of a thin slice or section of the 3D object. That is, for each slice of the 3D object: (a) powder is deposited in positions that correspond to positions in the slice where the 3D object exists, and (b) powder is not deposited in positions that correspond to positions in the slice where the 3D object does not exist.

Thin slices of the 3D CAD model may be created, for example, by starting with a 3D model in STL file format and using the Slice Commander feature of Netfabb® Studio software (available from netfabb GmbH, Parsberg, Germany) to create the thin slices.

Selective Deposition of Powder:

According to principles of this invention, the powder may be selectively deposited on substrate layers in many different ways.

Example 1 (of Selective Deposit of Powder)

First, powder may be selectively deposited on a substrate layer by making the powder adhere to a liquid, as follows: A liquid is selectively deposited on a substrate layer, so that some parts of the substrate layer are covered with liquid, and some are not. Then the side of the substrate layer on which the fluid was deposited is flooded with powder (e.g., the powder is poured on this side of the substrate layer). The powder adheres to the liquid. The excess powder (i.e., the powder that is not adhering to the liquid) is removed. For example, this excess powder may be removed by vacuuming. Or, for example, the substrate may be flipped over, so that the excess powder falls off. Or the substrate may be turned upside down and flicked with a finger. The substrate may also be vibrated while the excess powder is removed, in order to facilitate the removal.

In some cases, the liquid that is selectively deposited is water (or an aqueous solution that includes a material that slows the evaporation of water). For example, the material may be 2-pyrrolidinone. In other cases, it is a different liquid, such as an alcohol. For example, if the substrate is water sensitive (e.g. if the substrate is polyvinyl alcohol, PVOH), then water may distort or dissolve the substrate. In that case, an alcohol may be used as the liquid that is selectively deposited. In some cases, to prevent the liquid that is selectively deposited from spreading or being excessively absorbed into the substrate, it is helpful to apply a surface energy modifier to the substrate, before selectively depositing the liquid. For example, Scotchguard® Fabric & Upholstery Protector (available from 3M, St. Paul, Minn.) may be sprayed or deposited on the substrate layer for this purpose. Alternatively, other repellents or surface energy modifiers can be used.

In this first example, a variety of methods may be used to dispense the liquid. For example, a thermal inkjet head or a piezoelectric inkjet head may be used to dispense the liquid. For example, the inkjet head may comprise a HP45 cartridge, HP C 6602A cartridge, or HP51604A cartridge (available from Hewlett Packard Corp.) or a Lexmark® 50 cartridge or Lexmark 60 cartridge. Alternatively, air pressure may be used to dispense the liquid (e.g., through a 0.005 inch nozzle obtained from the Lee Company, Essex, Conn., part INZA650935K). If air pressure is used, the release of air or dispensing of liquid may be controlled by a solenoid valve.

Example 2 (of Selective Deposit of Powder)

The powder may alternatively be selectively deposited by flooding one side of a layer of substrate with powder, then selectively heating the opposite side of the substrate with an appropriate device such as a thermal print head. For example, a thermal print head from Mitani Micronics Co., Ltd., Tokyo, Japan may be used. In this approach, the thermal print head includes a high-resolution array of heating elements, which may be selectively turned on or off. In the areas that are heated, the powder melts and adheres to the substrate. The excess powder that has not adhered is removed. Again, this may be done by vacuuming the excess powder, or by flipping the substrate layer over. Again, vibration may be used to facilitate the removal of the powder. The thickness of the deposited powder can be controlled in this example implementation by doctoring a precise thickness of powder on the substrate.

Example 3 (of Selective Deposit of Powder)

Alternatively, powder may be deposited using a selective deposition technique similar to that employed in xerographic printing. In this approach, an electrical charge is imparted to powder particles, which are directed toward the substrate layer and then selectively adhere to some portions of the substrate but not others due to electrostatic attraction or repulsion. The powder particles adhere to portions of the substrate that have an opposite electrical charge, or that are adjacent to a surface that has such a charge, and are repelled from portions of the substrate that have the same electrical charge or that are adjacent to a surface that has such a charge.

Example 4 (of Selective Deposit of Powder)

The powder may be alternatively deposited using a selective deposition technique similar to that employed in magnetographic printing. In this approach, powder selectively adheres to some portions of the substrate layer, but not others, due to magnetostatic interactions between the powder and the substrate layer (or a surface adjacent to the substrate layer). For example, the powder may be a single component magnetic toner, or may comprise a colloidal suspension (e.g., a ferrofluid), or may be a dual component toner. A variety of magnetic pigments, such as magnetite ($Fe_3O_4$) or ferric oxide ($Fe_2O_3$), may be used for the toner in this approach.

General observations on selective deposition of powder:

In all of the above examples, the step of selectively depositing powder may include a substep of directing solid powder toward the substrate layer in a non-selective manner. For example, this substep may comprise flooding the entire layer of substrate with powder. Or, for example, in the xerographic or magnetographic examples, this substep may comprise sending electrically charged or magnetized powder toward the entire substrate layer.

This invention is not limited to the four examples of selective deposition described above, but may be implemented using any technique known in the art to selectively deposit the powder.

In exemplary implementations, liquid is selectively dispensed in a 2D pattern that corresponds to the slice that it is being printed for the particular substrate layer. After the liquid is dispensed on that substrate layer, the top of the substrate layer is then flooded with thermoplastic powder. The powder adheres to the liquid, but does not adhere to the portions of the substrate layer that are not covered with the liquid. The excess powder is then removed. This may be done, for example, by vacuuming the excess powder off, or by the simple expedient of flipping the substrate layer over.

Heat, Pressure:

In exemplary implementations of this invention, pressure and heat are applied to the layers of substrate being fused, to melt the powder and to press the layers together. The pressure may additionally tend to force the melted thermoplastic to coat the substrate.

For example, a hot stamp press may be used to apply heat and pressure. Or, for example, the substrate may be placed in a heated oven, while pressure is applied with a clamp or other compressive device. In both cases, once the powder melts, the pressure may tend to force the molten material to coat the substrate layers. In the case of oven heating, a tacking iron may be used to tack the substrate layers together before inserting them into the oven.

In many implementations, the powder is caused to melt after it has been selectively deposited: i.e., the melting occurs after the excess powder has been removed.

However, if a thermal print head (with an array of heating elements) is used, then the melting is part of the process of selective deposition. The print head selectively heats portions of a substrate layer that has been flooded (on the side of the substrate layer opposite from the print head) with powder, so that, in the heated areas, the powder melts and adheres to the substrate. Excess powder is removed. Heat and pressure are then applied, causing the adhered material to melt (or to remain molten) and to coat part of the substrate.

The molten material then cools and solidifies into a solid that coats a portion of the substrate layer. It also holds multiple substrate layers together.

For example, if the substrate is fibrous, the molten material may coat these fibers. When the material solidifies, it continues to coat these fibers.

How frequently the powder is melted and the pressure is applied may vary. In some implementations, these steps occur once for each layer. In other implementations, at least some of these steps occur less frequently. For example, heat and pressure may be applied only once for every two layers of substrate, or once for every five layers of substrate, etc.

Removal of Excess Substrate:

A portion of the substrate is not coated, because powder was not present and melted in that area. That excess substrate is removed.

A variety of removal techniques may be employed for excess substrate removal. In some embodiments, excess substrate is removed by one or more of: dissolution, polymer degradation, mechanical abrasion, or melting. If dissolution or degradation is employed to remove excess substrate, the dissolution or degradation may be accelerated by agitating and/or heating the agent used for dissolution and/or degradation. For example, any of the following may be agitated or heated to speed the dissolution or degradation: (a) sodium hydroxide or other alkali in aqueous solution or in an alcohol (e.g., ethanol or methanol), (b) potassium hydroxide in an alcohol (e.g., methanol or in ethanol), (c) water, and (d) hydrochloric acid in aqueous solution. Agitation may be achieved, for example, by ultrasound, a magnetic or paddle stirrer, shaking, or jets of liquid. If mechanical abrasion is used, then it is advantageous to use a substrate material that can be easily removed by abrasion when not coated. The object may be placed in a mechanical tumbler to facilitate abrasion.

This invention is not limited, however to the methods of removing excess substrate listed above. Other removal approaches may be employed which rely on a difference in material properties of the substrate and the solidified thermoplastic that causes the former to be more susceptible than the latter to the removal agent.

In some exemplary implementations, the removal of the excess substrate occurs just once, at the end of the process. Alternatively, the removal of the excess substrate may occur more than once during the process.

Thermoplastic or Thermosettable Powder:

In exemplary implementations, a thermoplastic powder is used. For example, the powder may be Shaetti® SF 400 or Shaetti® Fix 1820 thermoplastic powder (available from Shaetti America, Inc., Mooresville, N.C.) or another powder that melts, flows, and bonds under heat. The thermoplastic powder may comprise a polyethylene or other polyolefin. Advantageously, polyethylene may have a lower melting point than the substrate, and may be impervious to many solvents, acids and other chemicals that degrade plastics (and thus would not be affected if such chemicals were used to remove excess substrate).

Alternatively, a thermosettable powder that melts and flows sufficiently to coat the substrate may be used.

Substrate/Removal of Excess Substrate:

Depending on the particular implementation of this invention, different types of substrates may be used, and, correspondingly, different materials may be used to dissolve or degrade excess substrate. Table 1 is a non-exhaustive list of some materials that may be used as the (1) substrate and (2) corresponding solvent or material for degradation.

TABLE 1

Substrates and Removal Agents

| Substrate | Material used for removal of excess substrate (e.g., by dissolution or degradation) |
|---|---|
| Polyethylene terephthalate (PET) | mixture comprising either: (1) alcohol and alkali (e.g., Everclear ® grain alcohol and sodium hydroxide) (the alcohol may comprise ethanol or methanol); or (2) methanol and potassium hydroxide. |
| polylactic acid (PLA) | (1) sodium hydroxide (in aqueous solution), or (2) potassium hydroxide (in methanol or ethanol) (3) Strip-X ® Stripper*(available from W. M. Barr & Co., Memphis, TN) |

TABLE 1-continued

Substrates and Removal Agents

| Substrate | Material used for removal of excess substrate (e.g., by dissolution or degradation) |
|---|---|
| polyvinyl alcohol (PVOH) | water |
| polyamide (nylon) | hydrochloric acid |
| water soluble paper | water |
| paper | hydrochloric acid, or enzymes |
| silk | hydrochloric acid |
| fiberglass | hydrofluoric acid |
| carbon fiber, fiberglass, ceramics | abrasion |

*Strip-X ® Stripper contains acetone, methanol, methylene chloride, toluene, and xylene.

For example, PLA (available from Ahlstrom Chirnsdale Ltd., Chirnsdale, Scotland, U.K., and from C.L. Enterprises, Wenzhou, China) may be used as the substrate.

In exemplary implementations, the substrate comprises a woven material. Alternatively, the substrate may comprise a non-woven textile. For example, non-woven PVOH (available from Freudenberg USA) may be used as a substrate. Also, for example, the non-woven substrate may comprise HV 7841, HV 7801 or HV CTR2863A polyester, each available from Hollingsworth and Vose (East Walpole, Mass.), or may comprise A0514WHT polyester, available from Freudenberg. Or, for example, the substrate may comprise paper or another cellulose-based or plant fiber-based material.

As noted in the table above, water-soluble paper may be used for the substrate. For example, the water soluble paper may be of the type described in U.S. Pat. No. 3,431,166 (in which paper is reacted with alkali during manufacture). Or, for example, the paper may employ polyvinyl alcohol (PVOH) which is used to bind paper fibers together. The former type of water soluble paper may be obtained from Aquasol Corporation (North Tonawanda, N.Y.), and the latter type may be obtained from Hollingsworth and Vose Company (East Walpole, Mass.).

A problem with water-soluble paper is that it tends to swell when exposed to water. This swelling may be reduced by using a high pressure water jet, which tends to rapidly remove the paper that has been exposed to water, before the water can migrate into paper that has been partially coated with melted powder.

Alternatively, if ordinary paper (that is not water-soluble) is used as the substrate, then excess paper may be removed by enzymes that digest paper. For example, in a working prototype of this invention, the enzyme complex Accellerase® 1500 from Genencor (a division of Danisco USA, Inc., Tarrytown, N.Y.) is used for that purpose. An advantage of this approach is that it lessens or avoids the swelling associated with simply dissolving some types of water-soluble paper.

This invention is not limited to the substrate materials and solvents or degrading agents listed in Table 1, but may also be implemented with other substrate materials, and solvents and degrading agents.

Among other things, different substances may be applied to or incorporated into the substrate layers in order to modify the absorption characteristics or surface energy of the substrate. For example, the substrate's absorption characteristics may be modified in this way with respect to a variety of liquids, such as melted powder, or liquid solvent or degrading agent, or a liquid that is dispensed for the powder to adhere to. In some implementations, a sizing material that acts as a filter or a glaze may be used for this purpose. The use of Scotchguard® Fabric & Upholstery Protector (available from 3M, St. Paul, Minn.) or other repellents, such as those mentioned above, is an example of applying a substance that changes the absorption characteristics and surface energy of the substrate layer.

Registration/Alignment:

In exemplary implementations of this invention, a registration/alignment mechanism is employed to cause the layers of substrate to be aligned during the 3D printing process. For example, guide posts in a registration form may be inserted into guide holes in the substrate layers. Or, for example, a corner of each substrate layer may be pushed into a guide corner, to align the layer with other layers. Or, for example, a light sensor or camera may be employed to determine whether substrate layers are aligned. Alignment of the substrate layers may include folding a single substrate layer onto itself one or more times. This invention is not limited to the specific alignment/registration techniques described herein, but may employ any type of alignment/registration to align the substrate layers.

Figure 2A:
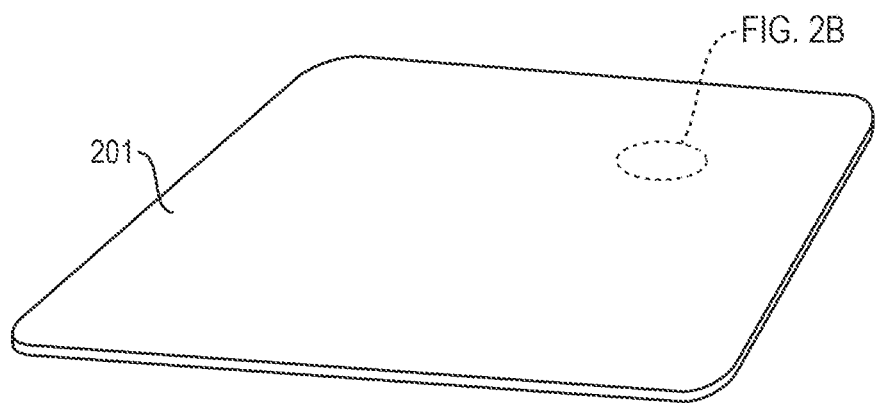
FIG. 2A shows an exemplary substrate layer useable in the present invention.
Figure 2B:
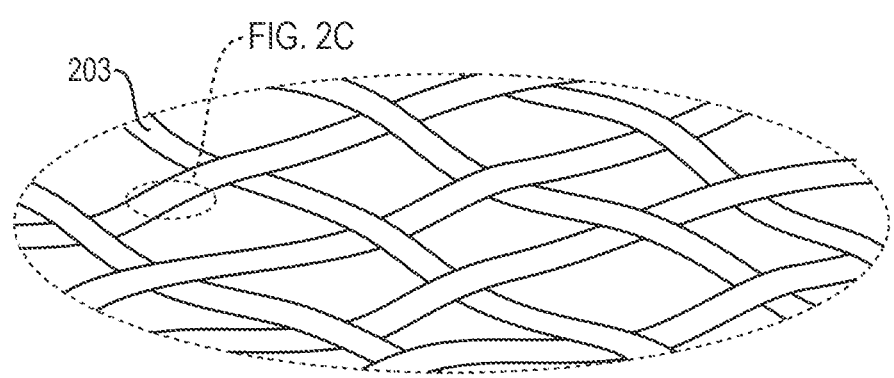
FIG. 2B is a magnified view of part of the same substrate layer, showing threads in the substrate layer.
Figure 2C:
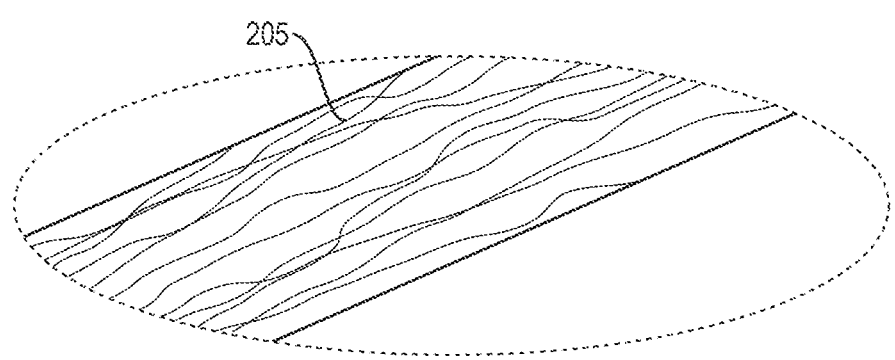
FIG. 2C is a magnified view of part of one of the threads, showing fibers in the thread.

Substrate Layers:

FIG. 2A shows a substrate layer 201, in an illustrative implementation of this invention. FIG. 2B is a magnified view of part of the same substrate layer 201, showing woven threads (e.g., thread 203) in the substrate layer. FIG. 2C is a magnified view of part of thread 203, showing fibers (e.g., 205) in thread 203. In the example shown in FIGS. 2A, 2B and 2C, the substrate is woven and fibrous. However, non-woven fibrous substrates may be used instead. For example, the substrate may comprise a composite, nonwoven material that includes threads, short fibers, long fibers, and/or whiskers. Alternatively, the substrate may comprise spherical particles, ellipsoidal particles, flakes, small platelets, or small ribbons, or particulates of any other suitable shape, which are joined together by a glue or other binding material.

Figure 2D:
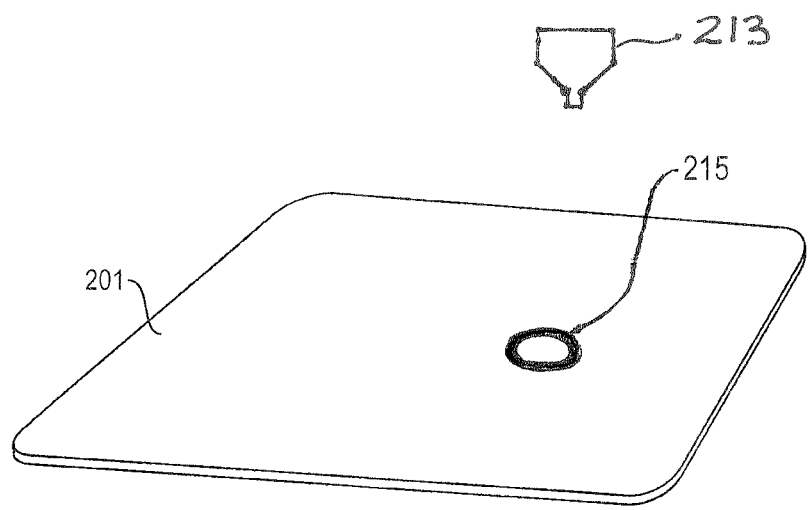
FIG. 2D depicts the exemplary substrate layer of FIGS. 2A-C with a deposited ring of liquid.

FIG. 2D shows substrate layer 201, after applicator 213 has selectively deposited a circular ring of liquid 215 on the layer. Deposited liquid 215 corresponds to a cross-sectional slice of the target 3D object (which, in this example, is a circular vase). For example, substrate layer 201 may comprise carbon fiber, and liquid 215 may comprise a thermosetting polymer resin mixture or a thermoplastic polymer liquid.

Figure 2E:
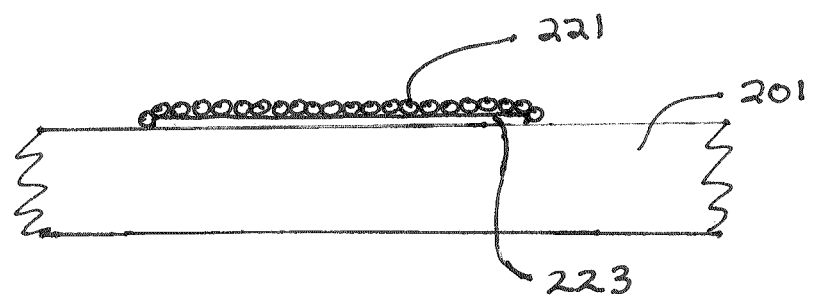
FIG. 2E is a cross-sectional view of the exemplary substrate layer of FIGS. 2A-C, showing thermoplastic powder adhering to liquid that has been selectively deposited on the substrate.

Alternatively, the liquid employed may be any liquid suitable for deposition by an applicator, e.g., by an inkjet head. For example, in those cases where a thermoplastic powder is used, liquid may be selectively applied by an inkjet head to the substrate layer in a desired pattern, and then powder may be flooded onto the substrate, and adhere to the liquid in the desired pattern. FIG. 2E illustrates this example. FIG. 2E is a cross-sectional view of substrate 201 of FIGS. 2A-C, showing thermoplastic powder 221 adhering to liquid 223 that has been selectively deposited on substrate 201. In a preferred embodiment, substrate 201 is a carbon fiber layer.

Note: thermoplastic powder is used in some implementations of this invention. However, in some other implementations of this invention, thermoplastic powder is not used, and a liquid thermosetting polymer or a liquid thermoplastic is selectively applied to the substrate layers.

Figure 3:
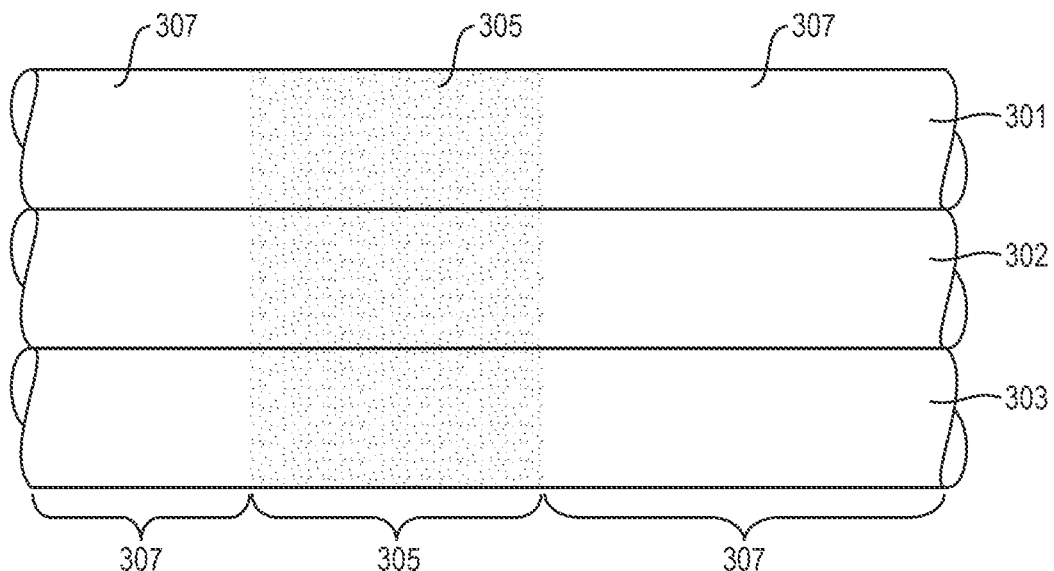
FIG. 3 is a cross-sectional view of multiple substrate layers bound together by solidified thermoplastic, after thermoplastic powder has melted, coated a portion of the substrate layers, and cooled.

FIG. 3 is a cross-sectional view of three substrate layers 301, 302, 303, after thermoplastic powder has melted, coated a portion of the substrate layers, cooled, and solidified, in an illustrative embodiment of this invention. A portion 305 of these substrate layers is coated by the solidified thermoplastic. Another portion 307 of these substrate layers is not coated by the solidified thermoplastic. The details of the coating may vary, depending on the implementation. For example, the solidified thermoplastic may coat, infiltrate, penetrate, or encapsulate a portion of the substrate layer, or substructures in a portion of the substrate layer, such as, but not limited to, threads, short fibers, long fibers, whiskers, spherical particles, ellipsoidal particles, flakes, small platelets, small ribbons, and/or particulates of any other shape. The thickness of the coating may vary, depending on the implementation. Likewise, the way in which the solidified thermoplastic connects or bridges between substrate layers may vary, depending on the implementation.

Figure 4:
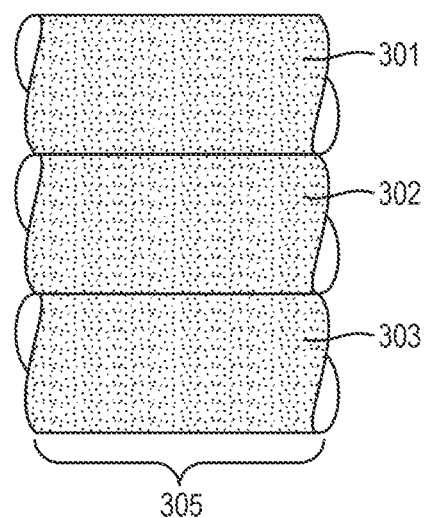
FIG. 4 is a cross-sectional view of the multiple substrate layers of FIG. 3, after excess substrate has been removed.

FIG. 4 is a cross-sectional view of the three substrate layers 301, 302, 303 of FIG. 3, after excess substrate (element 307 in FIG. 3) has been removed. That is, FIG. 4 shows these three substrate layers, after removal of the portion 307 of the substrate that is not coated by the solidified thermoplastic.

Figure 5:
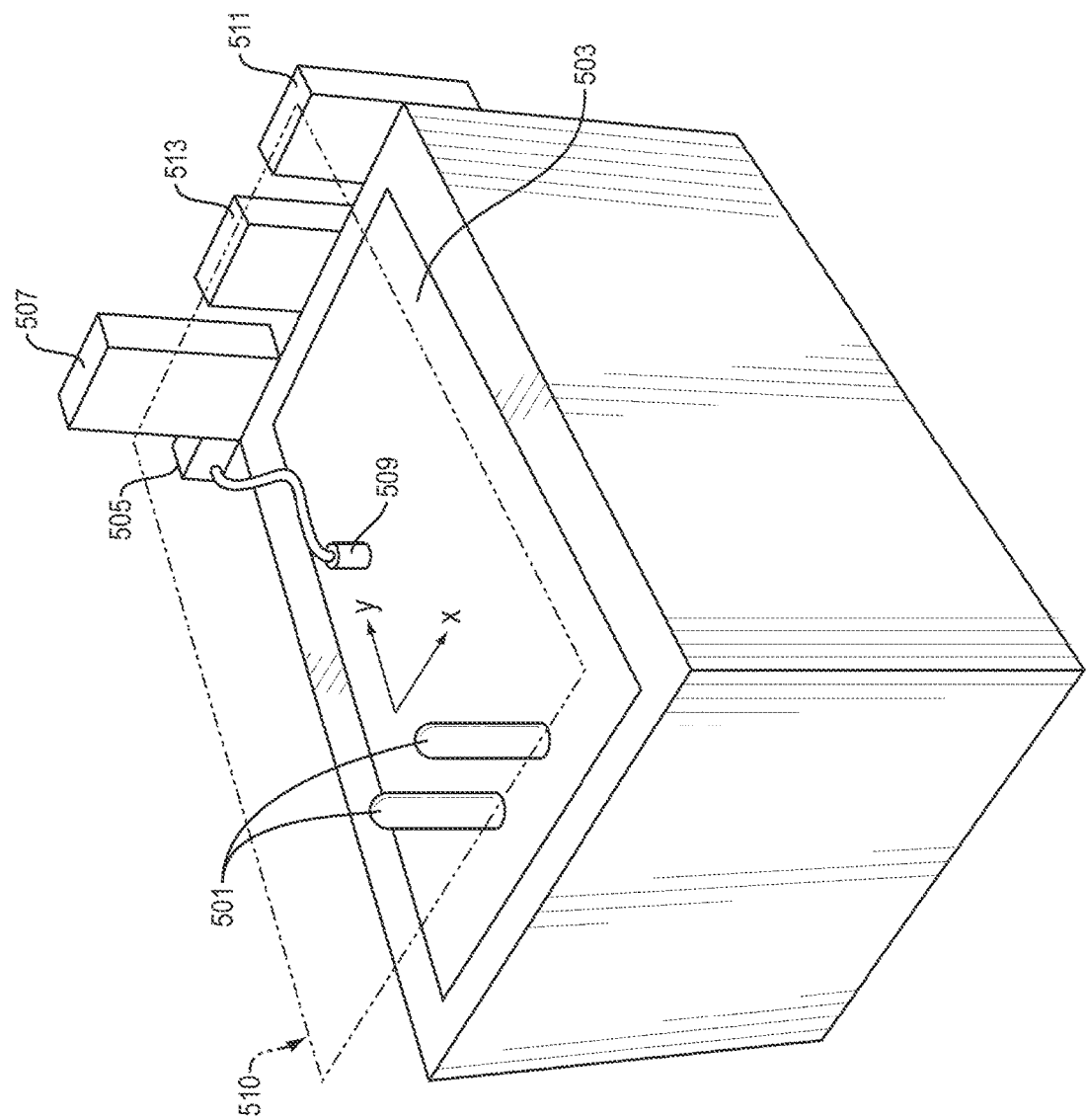
FIG. 5 shows apparatus used to selectively deposit liquid, to which powder adheres, in an illustrative implementation of this invention.

Rastering:

FIG. 5 shows apparatus used to selectively deposit liquid (to which powder adheres), in an illustrative implementation of this invention. In this implementation, registration guide posts 501 are inserted through a substrate layer 503 in order to properly align the substrate layer 503. A solenoid valve 505 is used to selectively dispense liquid from a liquid reservoir 507 though a nozzle 509 unto the substrate layer 503. The nozzle 509 is rastered in a 2D plane 510 that is parallel to, and above, the substrate layer 503, so that the liquid is selectively deposited at desired (x, y) coordinates of the substrate layer 503, and not deposited in other areas of the substrate layer 503. To achieve this rastering, a stepper motor 511 actuates two belts (not shown) that causes a support member (not shown) to move along two rails (not shown) in a direction parallel to the x axis. A second stepper motor (not shown) and third belt (not shown) are mounted on the support member, and are used to move a nozzle support (not shown) in a direction parallel to the y axis. The nozzle 509 is attached to the nozzle support. Together, the two stepper motors can move the nozzle 509 to any desired (x, y) coordinate above the substrate layer. A microprocessor 513 controls the stepper motors and the solenoid valve, thereby controlling when and where liquid is dispensed on the substrate layer 503.

Alternatively, rather than rastering in a line-by-line pattern, the stepper motors may cause the nozzle 509 to move in other 2D patterns in the 2D plane, in order to cause the liquid to be deposited at certain (x, y) coordinates.

FIG. 5 does not show apparatus for heating and pressing multiple layers of substrate, or for removing excess substrate. In some implementations, the substrate layer is moved to a different position before those steps occur.

Processors. In exemplary implementations, computer processors are used to control the 3D printing process.

Figure 6:
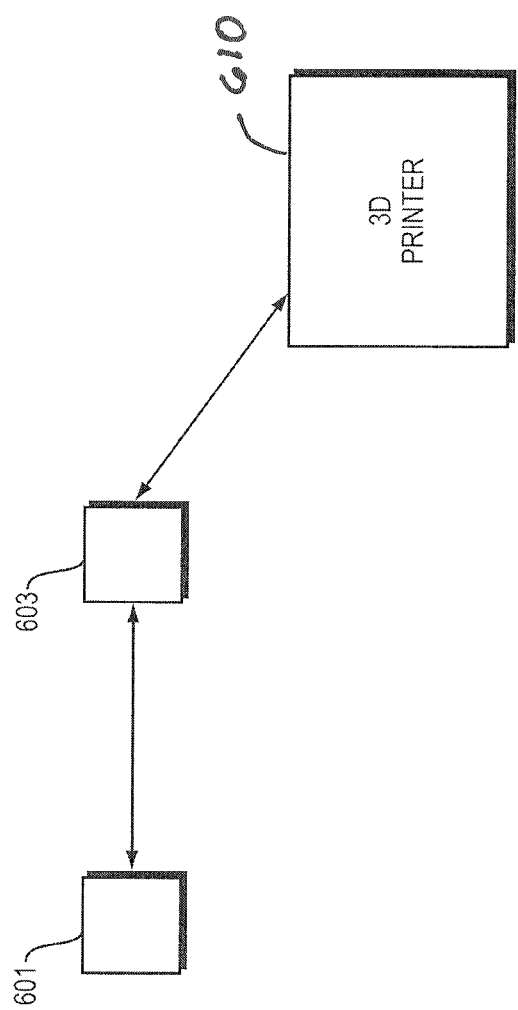
FIG. 6 is a high-level block diagram of processors, in an illustrative implementation of this invention.

FIG. 6 is a block diagram that shows a plurality of processors, in an illustrative implementation of this invention. A CAD model of a desired 3D object in STL file format is created using a remote processor 601. This processor 601 employs software (such as, for example, Netfabb® Studio software) to create a machine-specific build file. The machine-specific build file is exported to a second processor 603. Depending on the particular implementation, this second processor 603 controls the operation, including movements, of 3D printer 610, which may include: (1) an inkjet head or other device that selectively deposits liquid, (2) actuators that spread out the powder on the substrate and then remove the excess powder, (3) a thermal print head, (4) a hot stamp press, and/or (5) actuators that feed or flip over substrate layers.

Alternatively, this invention may be implemented with other arrangements of processors. For example, more than one remote processor and more than one onboard processor may be employed, and any of the above tasks may be handled by one or more of these different processors.

Ink Jet Printer:

In some implementations of this invention, an ink jet printer is used to selectively deposit liquid on a substrate layer. The liquid is conventional ink used for an inkjet printer. Alternatively, water or another wetting liquid may be used as the liquid. The ink jet head is rastered (or otherwise moved in a 2D pattern) across the substrate layer, using x and y stepper motors. As the inkjet printer head is rastered, it can print multiple lines of ink with each pass. After the liquid is selectively deposited on the substrate layer, the layer is flooded with powder (e.g., thermoplastic powder). The powder adheres where the liquid is present. Then excess powder (powder that does not adhere to the liquid) is removed. A heated press is used to melt the powder and to press layers of substrate together. All of these steps—inkjet printing, application of powder, removal of excess powder, and the heated press or iron—may be automated, in order to improve the precision and speed of steps in the process.

This approach (with an ink jet printer and heated press) has a number of advantages. First, it may be implemented using simple, low-cost apparatus. Second, it is fast: for example, ink jet printers can achieve rates of 30 sheets per minute. Third, objects can be printed in color and decorated. For example, in a prototype of this invention, dyes or pigment-based inks can be used, allowing fully decorated parts to be made. Fourth, the ink jet heads can be inexpensive. For example, disposable, inexpensive thermal inkjet heads (such as HP45 available from Hewlett Packard Company) can be used.

This ink jet approach/embodiment may be scaled easily. For example, the thermoplastic may be selectively applied to large (long) sheets of substrate. Unlike laser sintering and fused deposition, there is no need for a precision oven. The surface tension and evaporation of the liquid can be modified by using a liquid other than water, or by adding other compounds (such as ethylene, propylene glycol or 2-pyrrolidinone) to the water.

Prototypes:

The following is a description of three prototype implementations of this invention:

Prototype #1:

In a first prototype, the substrate is comprised of polyamide (nylon) fabric. A first layer of substrate is placed on a hot stamp press. A second layer of substrate is placed on another surface (not on the hot stamp press). Water is then selectively applied to that second substrate layer. The second layer is then flooded with Shaetti® SF 400 thermoplastic powder. The powder adheres to the water that was applied to the second layer. The second layer is turned upside down, which causes the excess powder (which is not adhering to the water) to fall off. The second layer of substrate is then placed in the hot stamp press, while still upside down, with the powder adhering to the bottom of the second layer. When it is so positioned, the second layer is on top of the first layer. The hot stamp press then heats and presses the two layers together. The process is repeated by adding a third layer of substrate, fourth layer and so on, each in the same manner as the second layer. Each time that the hot stamp press does a "stamp", it melts the powder beneath the top substrate layer. The resulting molten material coats a portion of the substrate layers, then cools and solidifies, causing the then current top and second-to-top layers of substrate to adhere to each other. The portion of the substrate to which the powder adhered is coated in a solidified plastic material.

After all of the layers of substrate have been added and pressed together, the resulting object is taken off the hot stamp press. It is then placed in an aqueous solution of hydrochloric acid. The hydrochloric acid causes the excess substrate, which is not coated by the solidified material, to dissolve. In order to speed up this dissolution, the solution may be heated and stirred by, for example, a magnetic stirrer. After the excess substrate is removed, what remains is the desired 3D object. This 3D object comprises solidified plastic (that resulted when the thermoplastic powder cooled) and the portion of the nylon substrate that it coats.

In this first prototype, each layer of substrate has guide holes in it. Registration guides (that are, for example, posts attached to the hot stamp press) are inserted into the guide holes of each layer of substrate, in order to make the substrate layers align with each other.

In this first prototype, Scotchguard® Fabric & Upholstery Protector (available from 3M, St. Paul, Minn.) may be sprayed onto each substrate layer before liquid is selectively deposited on the layer. This reduces the amount of liquid that is absorbed by the substrate and the distance the liquid spreads in the substrate. Alternatively, or in addition, each substrate layer may be suspended over a frame, so that the center portion of the layer is not touching any solid surface. This, too, tends to reduce the absorption of liquid by the substrate, and the spreading of the liquid.

Alternatively, in this first prototype, an alcohol (instead of water) may be selectively applied to the substrate layers.

Alternatively, in this first prototype, the substrate layers may be aligned and placed, one on top of another, in a compressive device that is tightened to apply pressure to compress the substrate layers together. This device, once tightened, may be placed in an oven (e.g., a conventional toaster oven).

In this first prototype, the excess substrate (comprised of polyamide) is removed with hydrochloric acid.

Prototype #2:

In a second prototype, water soluble paper is selectively printed with water using a 0.005 inch minstac nozzle obtained from the Lee Company, Essex, Conn. (part INZA650935K). In this instance, the amount of water deposited at this step is not enough to substantially dissolve the paper. The nozzle is rastered in a line-by-line pattern (or otherwise moved in a 2D pattern) above the substrate layer using two stepper motors that move in x and y directions. A microcontroller controls the stepper motors. It also controls the opening and closing of the valve in the nozzle. When the valve is open, water under pressure is deposited on the substrate layer.

In this second prototype, the paper that is used has been cut on a laser cutter, with two registration holes in the top of the paper. Paper is inserted into a machine where it is aligned on a registration form, and a "slice" of the object is printed with water on the paper. The water is selectively printed in a pattern that corresponds to the particular slice. The paper is then flooded with Shaetti® SF 400 thermoplastic powder which adheres only where the water has been deposited. The paper is then turned upside down and the excess powder falls off from the areas where no water has been deposited. The piece of paper for the first layer is then set on a registration form with two registration rods, on top of a bottom sheet of paper that was previously placed in the registration form. The paper with the powder attached is placed powder side down. This paper is then tacked to the bottom sheet using a tacking iron. This process is repeated multiple times until each layer of the object has been printed. The tacking iron is used to insure that powder remains attached to the paper after the water has dried.

In this second prototype, the sandwich of paper is clamped with a C-clamp using a rubber stopper between the C-clamp and the paper sandwich so that the force is retained as the paper sandwich is compressed when it is heated. This assembly is then put in an oven above the melting temperature of the thermoplastic powder and for a period of time which is longer as the part becomes larger. This causes the thermoplastic powder to penetrate the paper and glue the sheets of paper together. The paper stack is then removed from the oven and allowed to cool for about half an hour, allowing the thermoplastic to cool and solidify. Then the stack of paper is placed in a stream of water from a faucet. The water may be hot, since elevated temperature helps in dissolution. A jet of water (e.g., water pick) may also be used to accelerate the removal of the excess paper (i.e., the paper that is not coated with plastic). The excess paper is removed, resulting in a 3D object. Objects that are produced using this prototype are stiff and have good mechanical integrity. Before the excess substrate is removed, it acts as support for the 3D object being produced, allowing for a wide range of geometries to be constructed.

In this second prototype, other methods for applying heat and pressure may be used, instead of an oven and C-clamp. For, example, a heated press (such as a hot stamping press) can be used to apply heat and pressure to each substrate layer (or to a few substrate layers at a time). With a heated press, it can be easy to control the temperature, pressure and duration of each heat/pressure step. Or, for example, the paper layers may be aligned and placed, one on top of another, in a compressive device that is tightened to apply pressure to compress the substrate layers together. The compressive device, once tightened, may be placed in an oven (e.g., a conventional toaster oven). The compressive device may include springs or other elastic components that continue to apply pressure even if the thickness of the paper layers decreases (e.g., due to compression).

Prototype #3:

In a third prototype, an inkjet printer is used. The inkjet printer selectively deposits liquid on a substrate layer (so that the liquid is on some parts of the substrate layer and not on other parts of the substrate layer). In other words, the inkjet printer prints a pattern of liquid on the substrate layer. The substrate layer is then flooded with thermoplastic powder. The powder adheres to the substrate in accordance with the printed pattern (i.e., the powder adheres to the portion of the substrate layer where the liquid has been deposited, but does not adhere to the rest of the substrate layer).

Thus, an overall effect of the above steps in this third prototype is that the thermoplastic powder is selectively deposited on the substrate layer in a pattern, where the pattern corresponds to the pattern of liquid printed by an inkjet printer.

In this third prototype, a rectangular layer of substrate is taped to an 8.5 inch by 11 inch sheet of conventional paper. When doing so, the outer edges of the substrate layer are aligned with a rectangle printed on the sheet of paper Then, an HP 820CSE inkjet printer (manufactured by Hewlett Packard Company, Palo Alto, Calif.) prints a pattern of ink on the substrate layer. Conventional ink for that printer is used. The printed pattern comprises a grid that defines a matrix of tiles. In this printed pattern, a different cross-sectional "slice" of a three-dimensional object is printed in each of the tiles, respectively.

In this third prototype, different types of substrate material (and, correspondingly, different ways to remove excess substrate) may be employed. For example, the substrate may comprise PVOH. In that case, water may be used to dissolve the excess substrate. Or, for example, the substrate may comprise PLA. In that case, excess substrate may be removed by placing the rectangular cuboid in a solution of methanol and KOH. In order to speed the removal, this solution may be agitated with a magnetic stirrer, or may be placed in an ultrasonic tank.

Figure 7A:
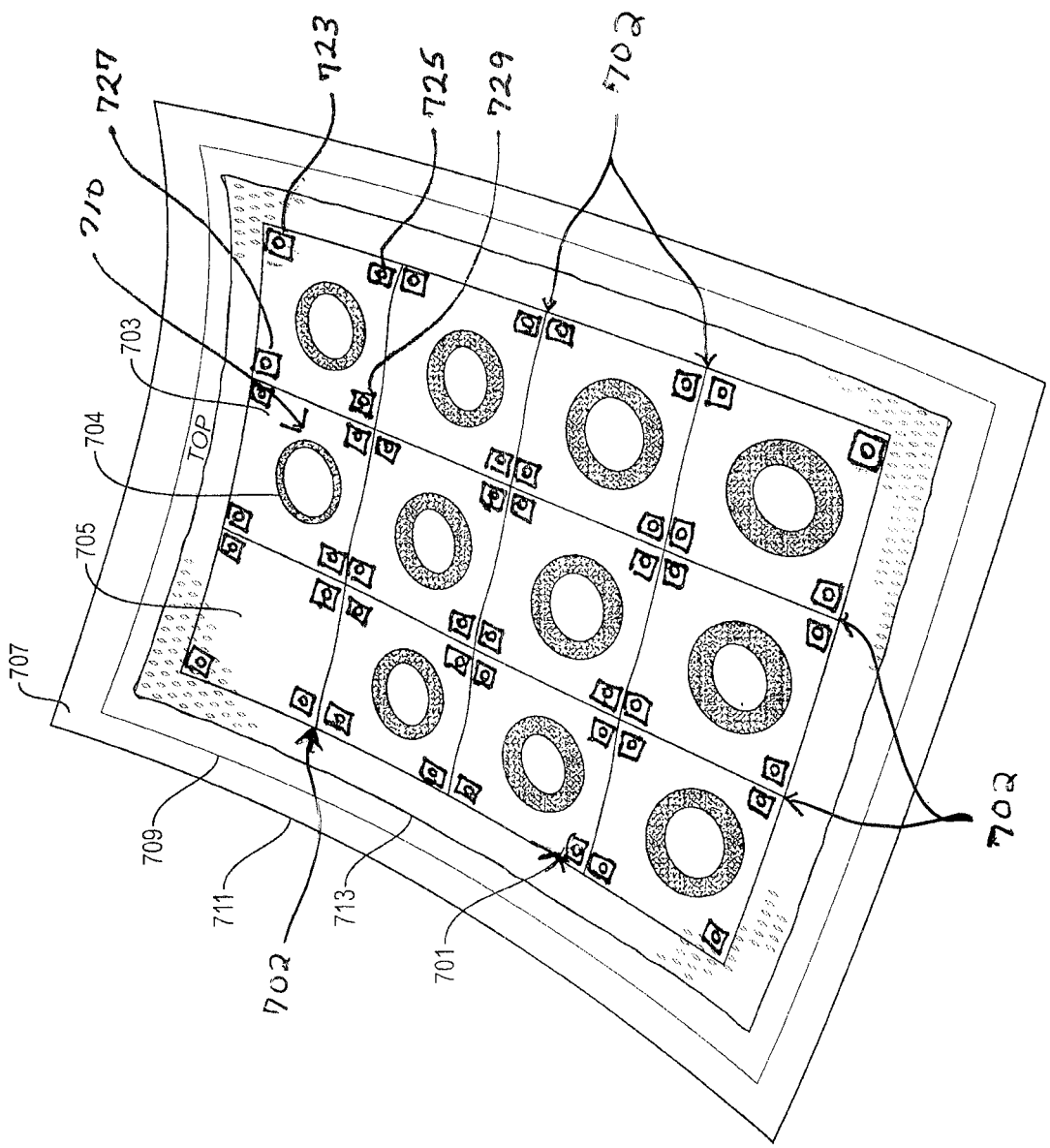
FIGS. 7A-D to 11 illustrate a prototype of this invention. In the example shown in FIGS. 7A-D to 11, a ring torus is being fabricated.

FIG. 7A shows a pattern that has been inkjet-printed on a substrate layer 701. The pattern comprises a grid 702 that defines a 4×3 matrix of tiles. Alternatively, the grid can be created by scoring or perforating the sheet to define the matrix of tiles. This can be accomplished using a laser cutter, knife blade, die cutter or any other suitable tool or methodology. Each tile is a pattern for a single "slice" of a desired 3D object. In the example of FIG. 7A, in each tile, respectively (e.g., tile 703), a different cross-sectional "slice" (e.g., slice 704) of a ring torus has been printed by the inkjet printer. In each tile (e.g., tile 703), there is at least one "positive" area (e.g. slice 704), corresponding to the region of the slice that will be part of the desired 3D object, and at last one "negative" area (e.g., area 710), corresponding to a region of the slice that will not be part of the desired 3D object. The upper left tile 705 in FIG. 7A is a null slice of the ring torus, (i.e., it does not include a part of the ring torus). While the substrate layer shown in this example consists of 12 tiles, the number of tiles per substrate layer can be varied as desired and could be more than 12 or as few as 2 per substrate layer.

FIG. 7A shows how the substrate layer is aligned with a sheet of paper 707. On the sheet of paper 707, rectangles have been pre-printed. Substrate layer 701 is taped on paper 707 so that the outer edges of substrate layer 701 align with one of these pre-printed rectangles on the sheet of paper. More specifically, in FIG. 7A, three rectangles, nestled inside each other, have been pre-printed on the paper. The outer rectangle 711 and central rectangle 709 of these three rectangles are visible in FIG. 7A. The innermost of these three pre-printed rectangles on sheet of paper 707 is not visible in FIG. 7A. However, the innermost rectangle is aligned with, and lies directly beneath, the outer edge 713 of the rectangular grid (visible in FIG. 7A) that was printed on substrate layer 701 by the inkjet printer.

In the four corners of each tile, the pattern includes four registration holes 723, 725, 727, 729, one hole per corner. Because the rim (which is square in FIG. 7A) of each hole is stronger than the hole itself, the hole can simply be poked out by a hard instrument. Alternatively, registration holes may be cut out (e.g., by a laser cutter). In either case, once the holes are formed, registration pins may be inserted through the registration holes in order to align the "slices" or the object.

In the example shown in FIG. 7A, a single sheet has a pattern for a 3×4 array of slices (i.e., 12 slices per sheet). Slices from ten such sheets may be used to fabricate a 3D object comprising 120 slices.

Signatures (in the printing sense) may be used when grouping the slices. In the example shown in FIG. 7A, each signature might comprise 6 slices. A total of 20 signatures would then be used to fabricate a 3D object comprising 120 slices. For example, the slice in tile 710 is the first slice out of 120 slices, and would be included in a first signature that comprises the first six slices out of the 120 slices.

After the inkjet printer prints the pattern on the substrate layer, the substrate layer is flooded with thermoplastic powder (e.g. Schaetti® Fix 400 powder). The excess powder is then removed, by turning the paper upside down and tapping the paper with a finger. Other removal methods may be used, such as vacuuming or blowing the excess powder away.

The substrate layer is then aligned on a laser cutter. The laser cutter then cuts lines that separate the substrate layer into the tiles and cuts two registration holes in each of the tiles As an alternative to cutting a substrate layer to form individual tiles, the lines that define the grid can be scored or perforated using a laser cutter, knife, die cutter or other suitable tool or methodology. The scoring or perforation can be done either after the powder is applied as described above, or before the slices of the object are printed onto the tiles of the substrate layer. In this alternate embodiment, after the powder is applied, some of the grid lines are cut so that the edges of the tiles that are defined by the grid line are separated, and then the tiles are folded to cause the tiles to be stacked one on top of the other in the correct order. A laser cutter, knife, due cutter, or other suitable tool or methodology can be used to make these cuts.

Figure 7B:
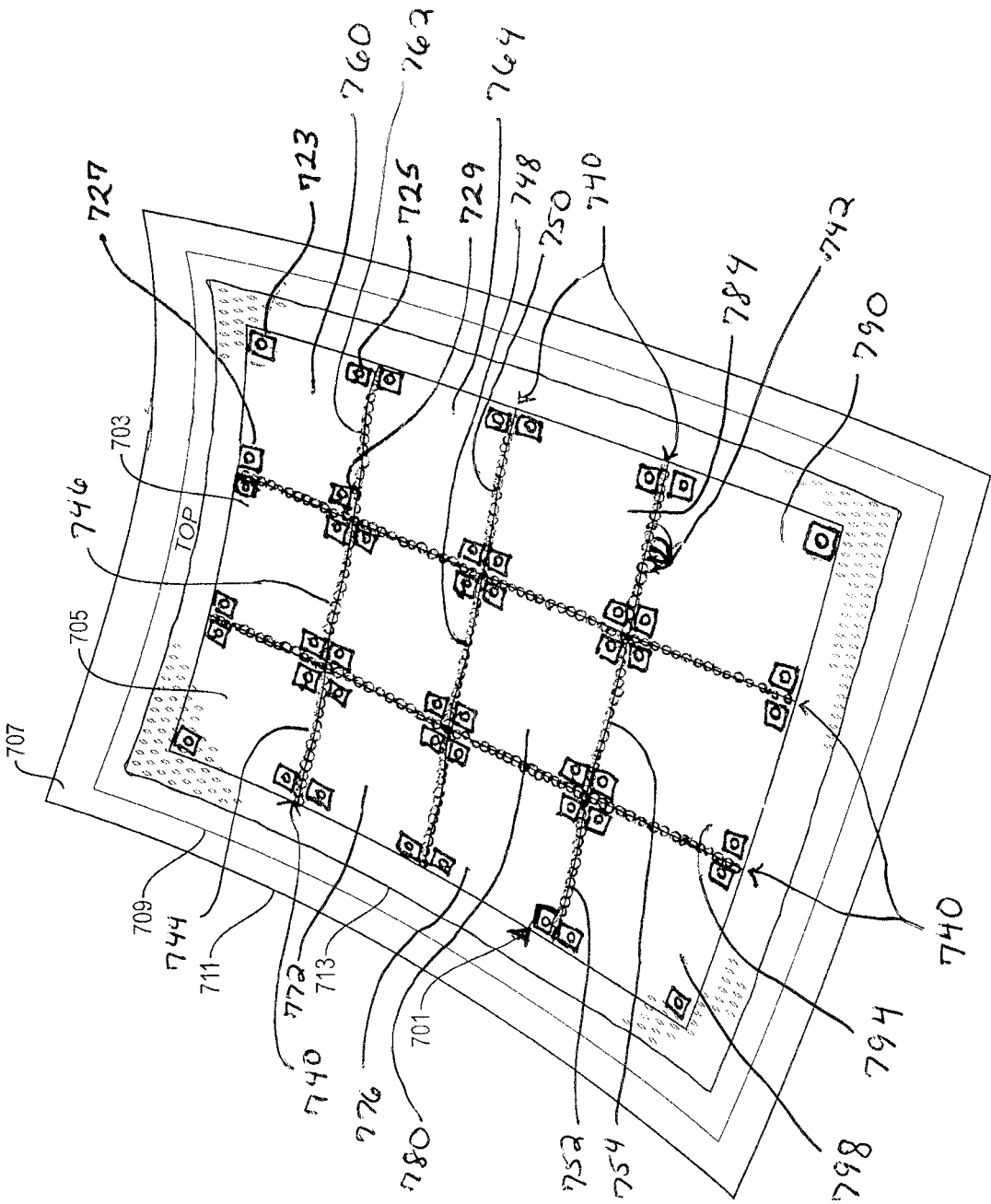
Figure 7C:
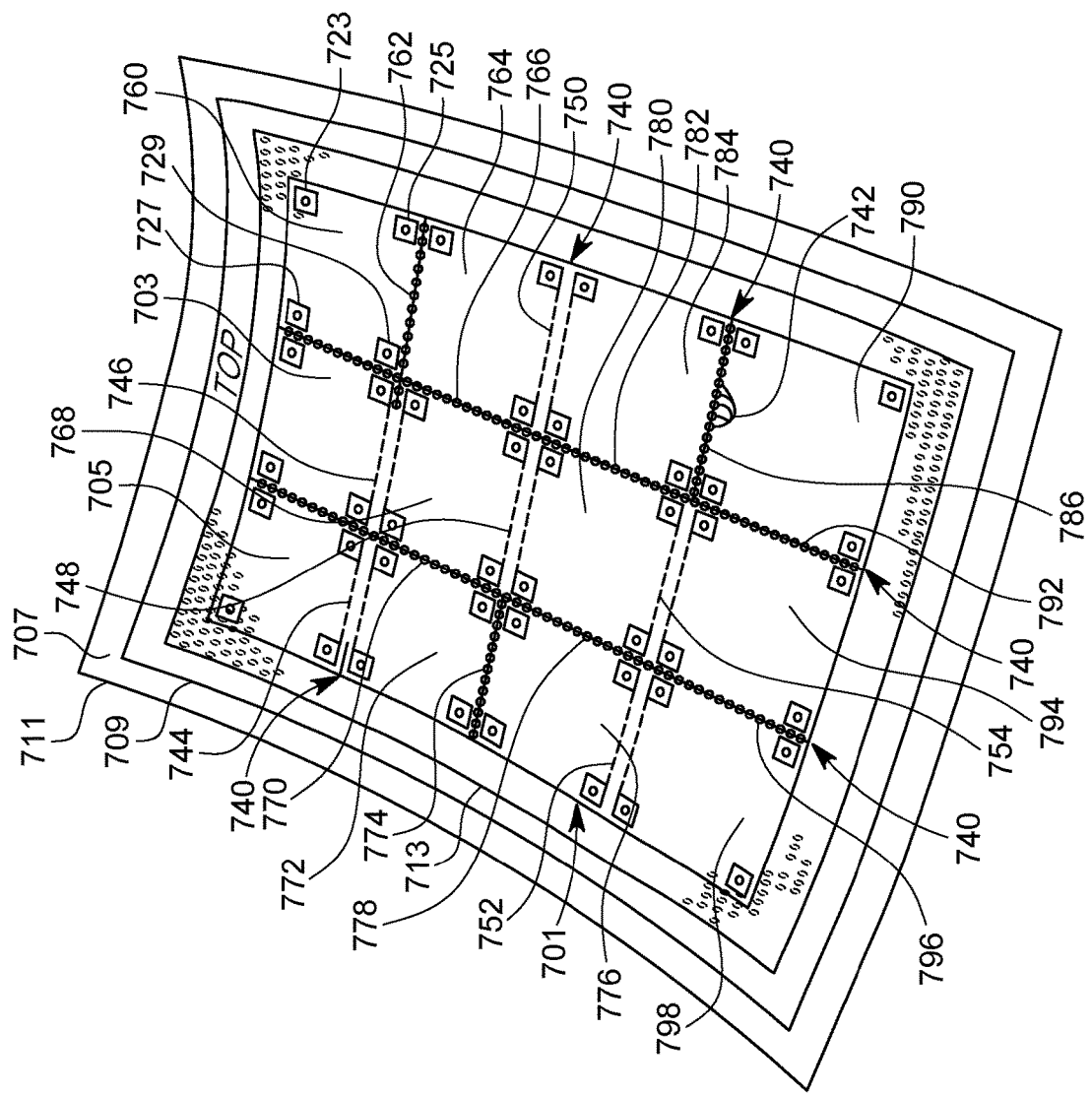

FIG. 7B depicts a substrate layer in which the grid 740 has been defined by laser cutting perforations 742 at the grid lines. The slices of the object have been printed onto the tiles and powder is applied in the same method as described above. FIG. 7C shows the substrate of FIG. 7B after some of the grid lines have been cut. The cuts are made so that the tiles can be consecutively folded. In FIG. 7C, the cuts were made along edges 744, 746, 748, 750, 752, 754.

The tiles are then folded to cause each tile to be stacked on top of or below a tile that shares a non-cut edge. Tile 705 is folded at edge 756 so that tile 705 sits on top of tile 703. Stacked tiles 703, 705 are then folded at edge 758 so that they sit under tile 760. Stacked tiles 703, 705, 760 are then folded at edge 762 so that they sit on top of tile 764. This pattern of folding is continued until all of the tiles on a substrate layer are stacked. So, for the example of FIGS. 7B and 7C, stacked tiles 703, 705, 760, 764 are then folded at edge 766 so that they sit under tile 768. Stacked tiles 703, 705, 760, 764, 768 are now folded at edge 770 so that they sit on top of tile 772. Stacked tiles 705, 703, 760, 764, 768, 772 are then folded at edge 774 so that they sit under tile 776. Stacked tiles 703, 705, 760, 764, 768, 772, 776 are then folded at edge 778 so that they sit on top of tile 780. Stacked tiles 705, 703, 760, 764, 768, 772, 776, 780 are then folded at edge 782 so that they sit under tile 784. Stacked tiles 703, 705, 760, 764, 768, 772, 776, 780, 784 are then folded at edge 786 so that they sit on top of tile 790. Stacked tiles 703, 705, 760, 764, 768, 772, 776, 780, 784, 790 are then folded at edge 792 so that they sit under tile 794. Finally, stacked tiles 703, 705, 760, 764, 768, 772, 776, 780, 784, 790, 794 are then folded at edge 796 so that they sit on top of tile 798.

Figure 7D:
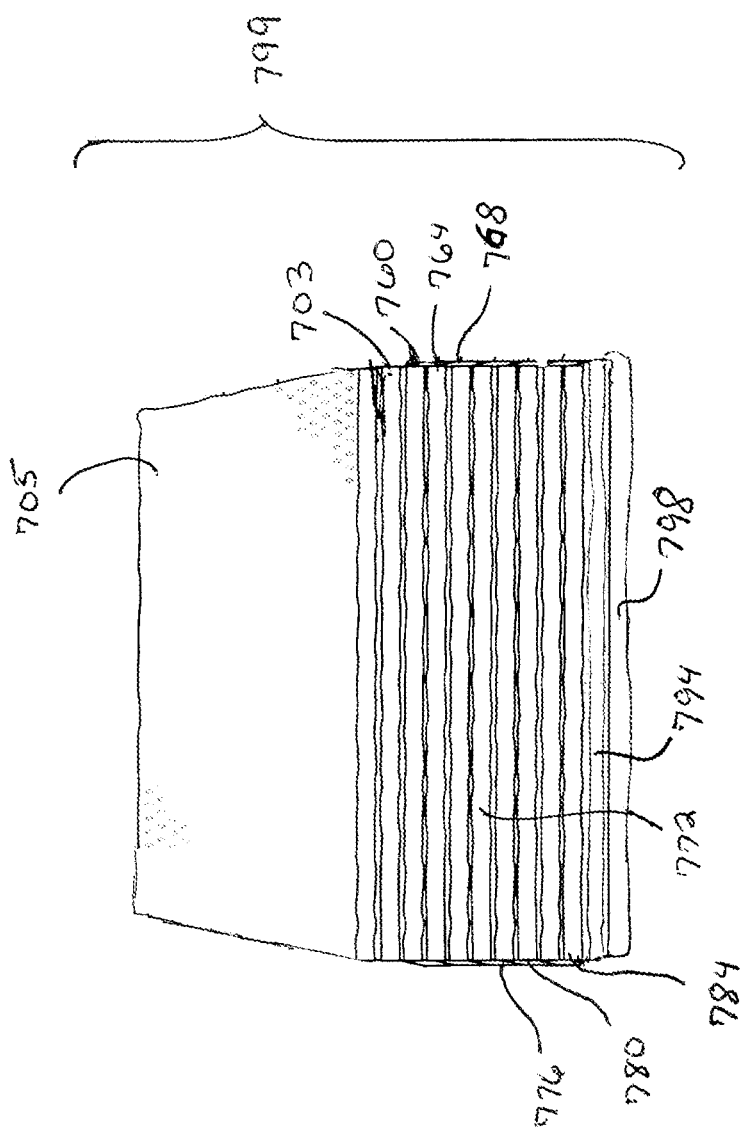

The finished stack 799 of tiles is shown in FIG. 7D. It will be clear to one of skill in the art of the invention that this exemplary folding scheme can be generalized to grids of any number of tiles. The slices of the 3D object printed onto the tiles are arranged in sequence and oriented so that when the tiles are folded in this fashion, they are located in the right place and orientation in the stack of tiles. In one embodiment, the software that creates the slides of the CAD model of the object is used for this purpose. The software can include programming to create, arrange, and orient the slices automatically.

The folding of the tiles can be automated using mechanical apparatus, or alternatively, the tiles can also be folded manually. To aid an operator to fold the tiles in the proper order, special marks may optionally be included on each tile. The marks can be geometric shapes or any other suitable indicia. The marks can be added before the substrate layer is used for printing or they can be created by printing them onto the tiles at the same time that the slices are being printed. The marks are positioned so that they will line up when the tiles are properly stacked. Thus, as each tile is folded upon another, the operator can visually check to see if the marks are aligned. Additionally, or alternatively, numbers can optionally be included on each tile so that tiles that are adjacent when stacked bear consecutive numbers. The numbers can be added before the substrate layer is used for printing, or they may be created by printing them onto the tiles at the same time that the slices are being printed. In this way, an operator can visually check to see if the tiles are in the proper order.

One benefit of folding the tiles is that it can be speedier than cutting and stacking each tile individually. Another benefit is that it helps in aligning each tile on top of the other, so that the slices of the object printed on those tiles are properly aligned in terms of both orientation and precision. The physical connection between each layer to the layers above and below it also helps to maintain the alignment between the layers during the subsequent compression and heating steps.

In the example of FIGS. 7A-D, each substrate layer is divided into 12 tiles, with a different "slice" of a ring torus being printed on each tile, respectively. These tiles are then placed in a device for applying pressure (a "compressive device"), one tile on top of another. The compressive device includes one or more elastic components (e.g., springs) to maintain pressure on the substrate layers even if they compress. The tiles are aligned by inserting two guide holes in each tile through two guide posts in the press, respectively.

Figure 8:
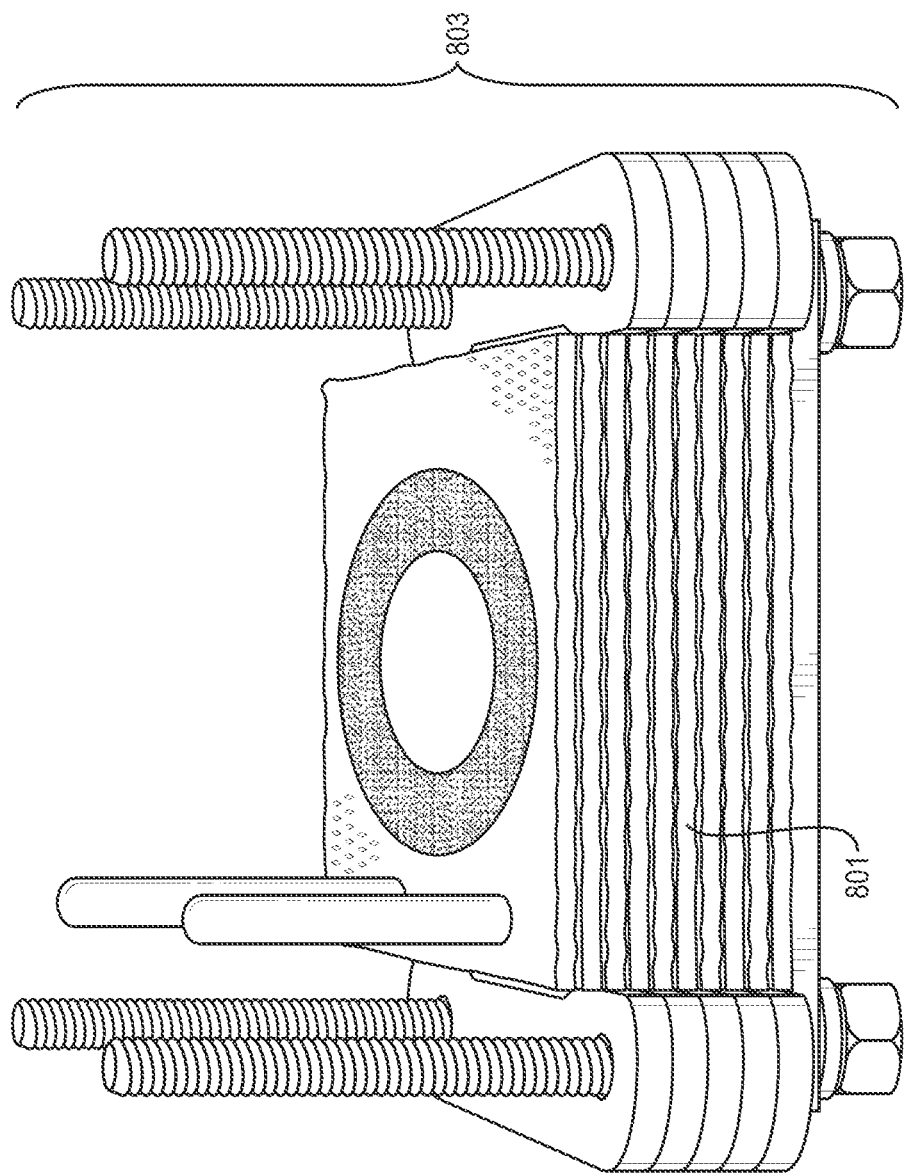
FIG. 8 shows a compressive device, after the substrate tiles (layers) have been placed in it, stacked one on top of the other in the compressive device. The tiles are aligned by inserting two registration pins of the compressive device into the two registration holes of each tile, respectively.

FIG. 8 shows a compressive device 803, after a number of substrate tiles (e.g., tile 801) have been placed in it, one on top of the other. These can be tiles that have been individually placed one on top of another or tiles that have been stacked by folding tiles in the manner previously described. If more than 12 tiles are needed, then the process is repeated, until enough all of the tiles required for fabricating the object (all of the slices) have been produced.

In the example of FIGS. 7A-D, substrate tiles for all of the "slices" of the ring torus are placed into the compressive device. The total number of substrate tiles required is more than 12. The process of printing 12 slices on 12 tiles on a substrate layer is repeated, layer by layer, until tiles for all of the slices have been printed. Each of the tiles is cut or folded from a larger layer or sheet of substrate, and the individual tiles themselves comprise the layers of the object being fabricated. The substrate tiles (object layers) that have been inserted into the compressive device are then compressed together by that device.

Figure 9:
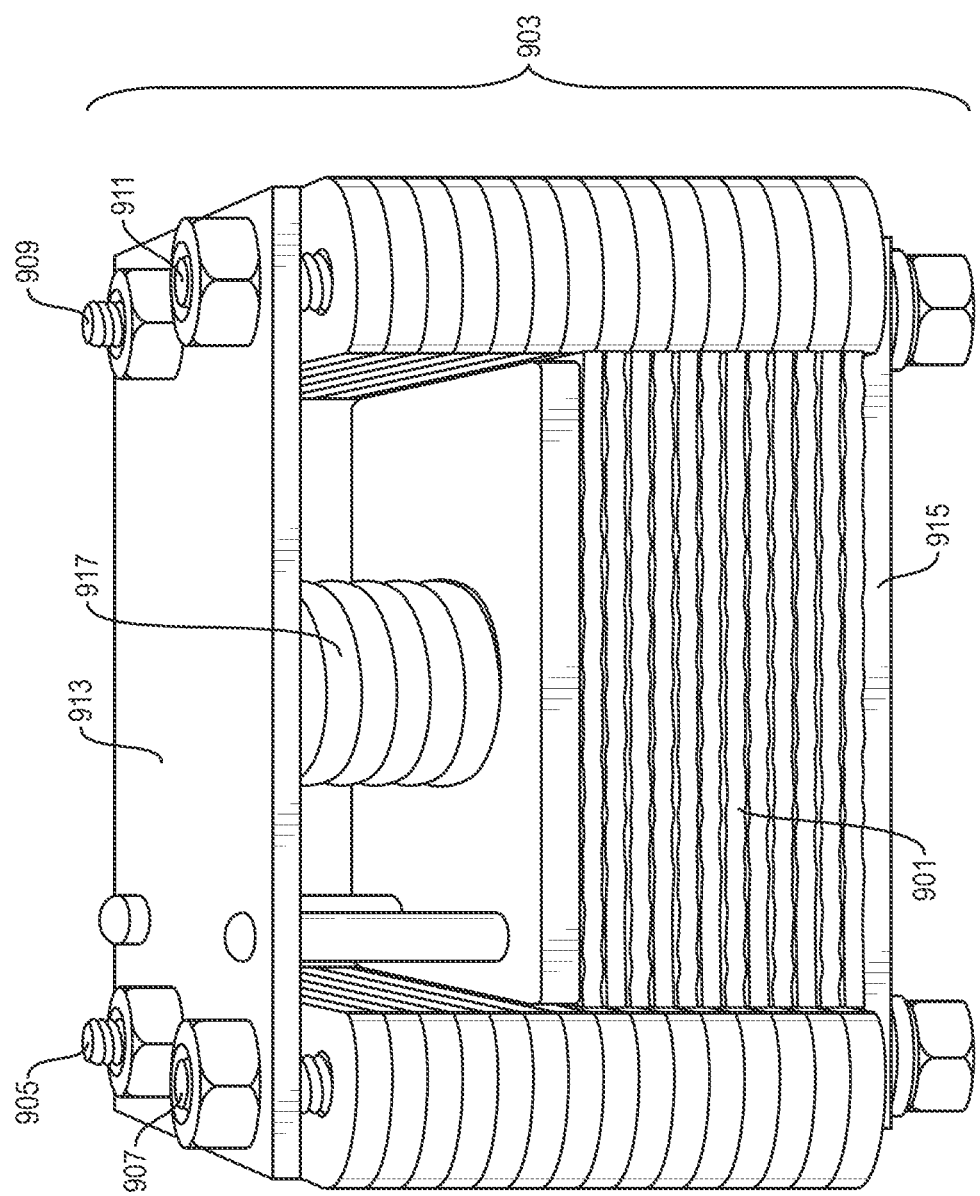
FIG. 9 shows the compressive device of FIG. 8, after all substrate layers with all of the "slices" of the ring torus have been inserted into it, assembled so that springs in the compressive device press the substrate layers together.

FIG. 9 shows substrate tiles (object layers) being compressed in exemplary compressive device 903. Screws 905, 907, 909, 911, plates 913, 915, and spring 917 in the compressive device are used to exert pressure.

In this example, once tightened, the compressive device (with the substrate tiles in it) is then placed in a conventional toaster oven. The compressive device includes both a spring, to maintain pressure on the substrate layers even if they compress, and a stand-off, clutch, brake, or damper to limit movement of the compressive device. Alternatively, the springs in the compressive device may be omitted and simple mechanical pressure of the screws can be used. Alternatively, a hot stamping press can be used to apply pressure.

The heat from the oven causes the thermoplastic powder to melt. The molten material coats the substrate layers. The compressive device (with the object/substrate layers in it) is then removed from the oven, and the object layers are allowed to cool. The molten material then solidifies. As it does so, it binds (fuses) the substrate layers comprising the object layers together.

Figure 10:
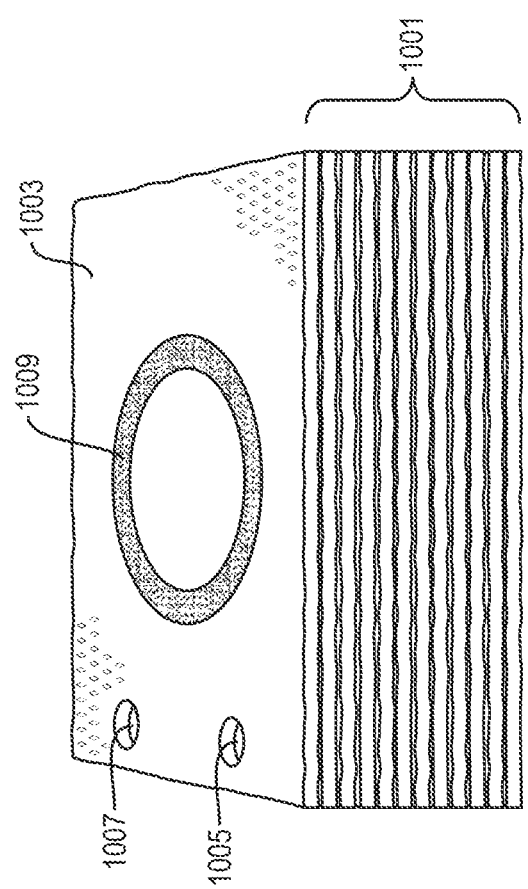
FIG. 10 shows the layers of substrate, fused together into a rectangular cuboid.

FIG. 10 shows the substrate layers 1001, after they have been fused together into rectangular cuboid 1003. In this example, a 3D toroid is being fabricated, with the uppermost slice 1009 of the toroid being visible at the top surface of the cuboid 1003. Two registration holes 1007, 1009 are visible in excess substrate that will be subsequently removed.

Figure 11:
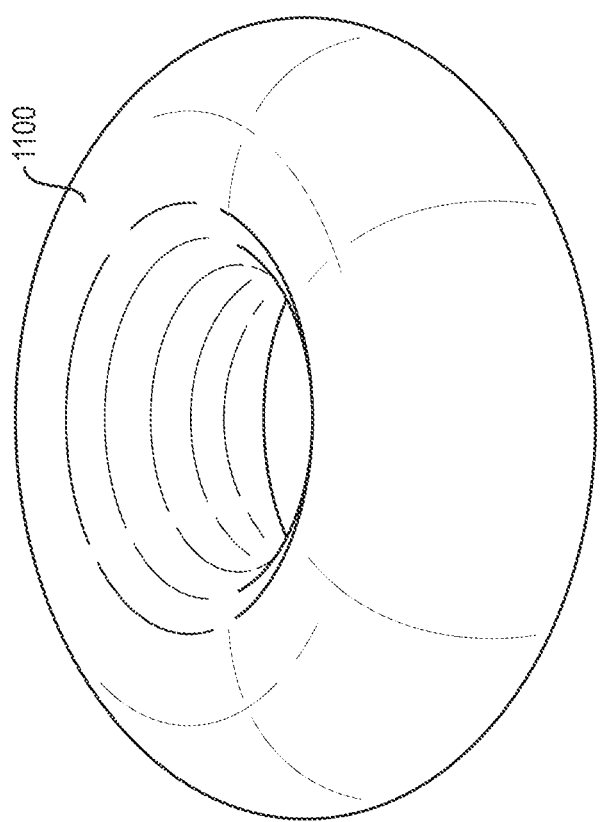

Excess substrate that has not been covered by the solidified material is then removed. In the example shown in FIG. 11, a ring torus 1100 remains after the excess substrate in the rectangular cuboid 1003 of FIG. 10 has been removed.

Many Ways of Implementing Invention:

This invention is not limited to melting of the powder, in which solid powder becomes liquid. Other transitions may be employed. For example, the powder may undergo a glass transition that allows it to penetrate the substrate. Or, for example, the powder may be transformed into in a bi-phasic material that can penetrate the substrate.

This invention is not limited to fibrous substrates. For example, the substrate may be a composite that comprises particles, ellipsoidal particles, flakes, small platelets, small ribbons, or particulates of any other shape, or a combination of two or more of these, which are bound or glued together by another material.

Figure 12A:
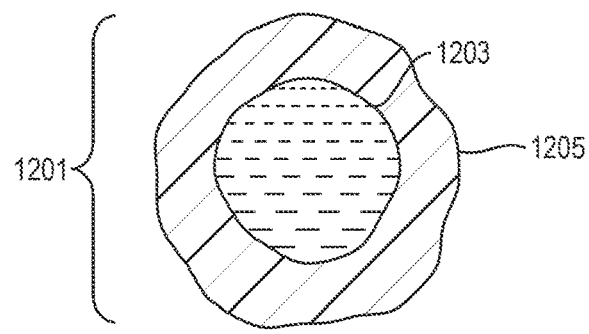
FIG. 12A shows a grain of powder that microencapsulates a liquid.

This invention may be implemented using grains of powder that each encapsulate (or microencapsulate) a resin or other liquid. In the example shown in FIG. 12A, a powder grain 1201 comprises a solid outer layer 1205 of thermoplastic or thermoset plastic. The outer layer 1205 encapsulates liquid 1203. The powder may be selectively deposited. Pressure (and heat) may be applied burst the encapsulation. The resin or liquid may then infiltrate into the substrate layers. The resin may harden upon exposure to (1) air, (2) a reactant, reagent, catalyst or solvent, or (3) electromagnetic radiation.

Figure 12B:
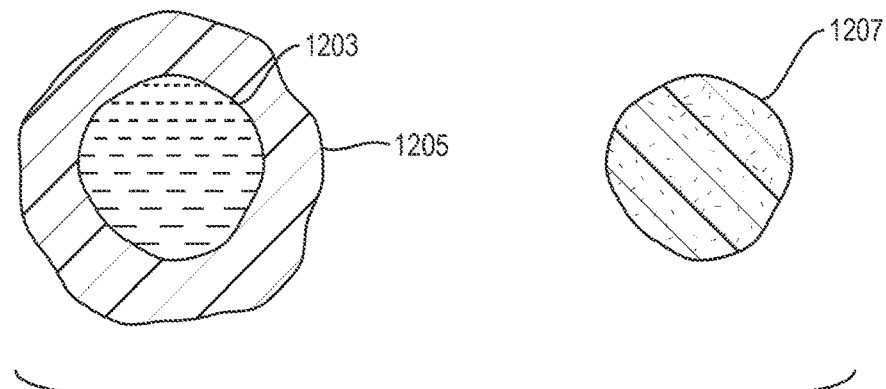
FIG. 12B shows a powder mixture that comprises two types of grains: first, a completely solid grain; and second, a grain that comprises a solid outer layer that encapsulates a liquid.

In an illustrative embodiment of this invention, grains of powder encapsulate (or microencapsulate) epoxy resin. Grains of epoxy hardener are also mixed into the powder. The powder mixture is selectively deposited. Pressure (and heat) may be applied burst the encapsulation, so that the resin penetrates into the substrate layers and then hardens. In the example shown in FIG. 12B, the powder mixture comprises two types of grains: completely solid grains of epoxy hardener 1207 and grains that comprise a solid outer layer 1205 that encapsulates a liquid epoxy resin 1203.

Alternatively, the substrate may be flooded with powder that encapsulates liquid. Pressure may be selectively applied (e.g., with a dot matrix print head) to burst the encapsulation, so that the liquid infiltrates the substrate layers and then hardens.

Figure 13:
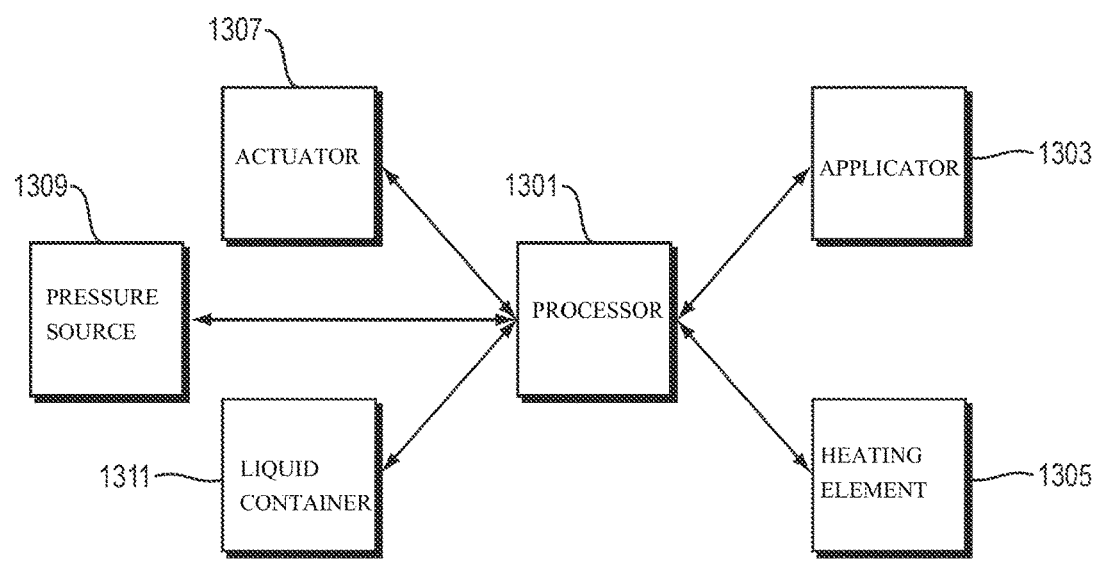
FIG. 13 is a block diagram that shows a processor that controls multiple components of an apparatus for fabricating a 3D object.

In exemplary implementations of this invention, a variety of means may be used to transform powder into a substance that flows and then subsequently hardens. For example, the means may comprise a heating element. The heating element may comprise any artificial heat source that heats by one or more of conduction, convection or radiation. As non-limiting examples, the heating element may comprise: (1) a resistor or any other resistive heating element; (2) any other device that converts electricity into heat by ohmic heating; (3) a hot stamp press or any other apparatus for applying heat and pressure; (4) an oven; or (5) an artificial source of electromagnetic radiation, including a heat lamp, an artificial infrared light source, a laser; or an artificial source of microwave radiation. Also, for example, the means may comprise an artificial pressure source, including a press, clamp, iron, roller, pump, piston, or elastic element (e.g. spring) for applying pressure. The pressure may be used, for example, to compress layers together or to squeeze the flowing substance into interstices in the substrate layers. Or, for example, the pressure may be used to crush, rupture or burst grains of powder that encapsulate liquid. The liquid may then flow, and may harden or cause something else to harden. The heating element or pressure source may be configured to transform powder into a substance that flows and then subsequently hardens. Also, for example, the means may comprise a reagent, reactant, catalyst, solvent or solute used in a chemical reaction. The reaction may soften or harden all or a portion of the powder. An applicator may be configured to apply, deposit, or deliver the reagent, reactant, catalyst, solvent, or solute to the powder. Also, for example, the means may comprise an artificial source of electromagnetic radiation. The radiation may, for example, be used for hardening the powder, including by curing. The radiation source may be configured to transform powder into a substance that flows and then subsequently hardens FIG. 13 is a high-level block diagram of some hardware that may be used in this invention. One or more processors 1301 control an applicator 1303, a heating element 1305, an actuator 1307, an artificial pressure source 1309, and a stirrer in a container of liquid 1311. Applicator 1303 deposits powder in positive regions, but not in negative regions, of substrate layers. Heating element 1305 transforms the powder into matter that flows and then hardens. The resulting hardened material is disposed in a spatial pattern that infiltrates the substrate layers. Artificial pressure source 1309 may comprise a press, clamp, spring, elastic element, or other device for compressing the substrate layers. The stirrer may be used to stir a liquid that is used for removing excess substrate.

Figure 14A:
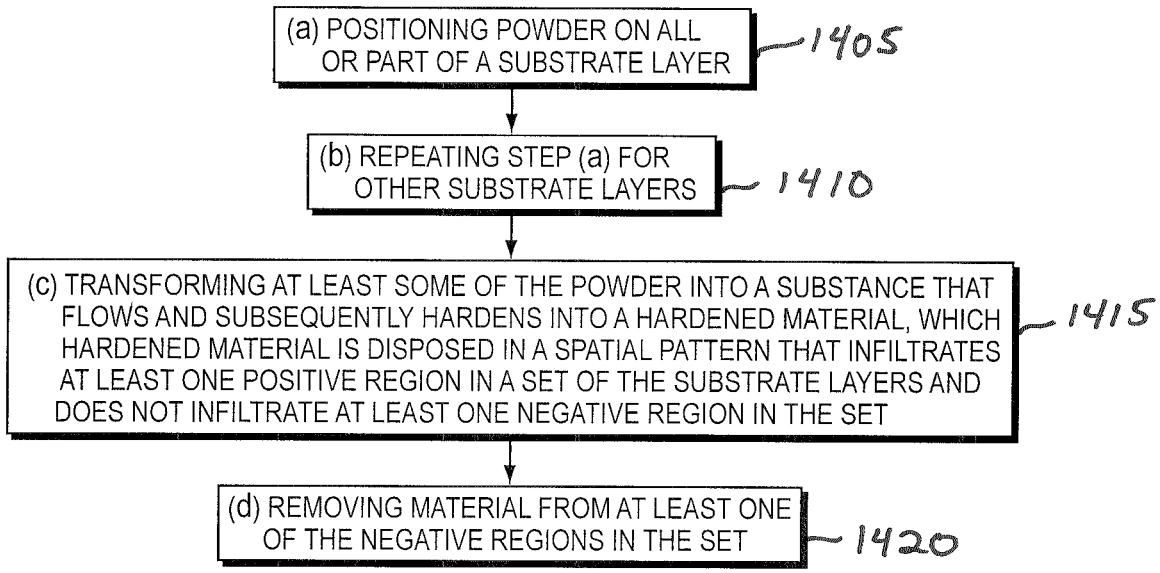
FIG. 14A is a high level flow chart of steps in an exemplary implementation of this invention.
Figure 14B:
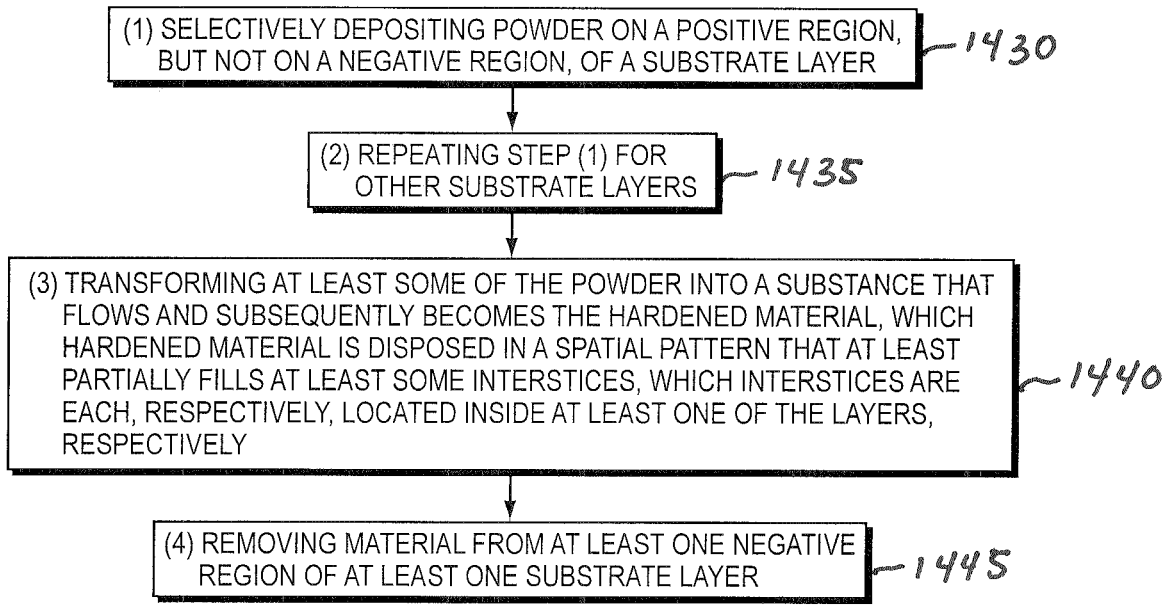
FIG. 14B is a high level flow chart of steps in another exemplary implementation of this invention.

FIGS. 14A and 14B are each flow charts of steps used to fabricate a 3D object, in two different illustrative embodiments of this invention, respectively.

In the embodiment of FIG. 14A, the steps are: (a) positioning 1405 powder on all or part of a substrate layer; (b) repeating 1410 step (a) for other substrate layers; (c) transforming 1415 at least some of the powder into a substance that flows and subsequently hardens into a hardened material, which hardened material is disposed in a spatial pattern that infiltrates at least one positive region in a set of the substrate layers and does not infiltrate at least one negative region in the set; and (d) removing 1420 material from at least one of the negative regions in the set In the embodiment of FIG. 14B, the steps are: (1) selectively depositing 1430 powder on a positive region, but not on a negative region, of a substrate layer; (2) repeating 1435 step (1) for other substrate layers; (3) transforming 1440 at least some of the powder into a substance that flows and subsequently becomes the hardened material, which hardened material is disposed in a spatial pattern that at least partially fills at least some interstices, which interstices are each, respectively, located inside at least one of the layers, respectively; and (4) removing 1445 material from at least one negative region of at least one substrate layer.

In some implementations of this invention, the melted or softened powder may enter the substrate layers by absorption.

In another aspect, this invention may comprise an article of manufacture. Advantageously, in some implementations, using powder permits the finished 3D product to have a high resolution in at least one dimension. In one example: powder is selectively deposited on substrate layers. For each layer, two substeps occur: first, an inkjet head is used to dispense liquid, and second, powder is applied and adheres to the liquid. The powder is then heated and flows, infiltrating the layers, and cooling into a solidified material that binds the substrate layers together. In this example, the spatial resolution of an exterior surface of the 3D product may be approximately equal to the resolution of the inkjet head in an x, y-direction and to the thickness of a substrate layer in the z-direction.

In an illustrative implementation, an article of manufacture may comprise substrate layers infiltrated by a hardened material. The hardened material may be a thermoplastic. In one example, an exterior surface of the hardened thermoplastic may have a spatial resolution of 60 or more dots per centimeter in at least one dimension, and the thermoplastic may have a viscosity of 50 or more centipoise at 50 degrees centigrade above the thermoplastic's melting temperature. Or, for example, an exterior surface of the hardened thermoplastic may have a spatial resolution of 170 or less microns in at least one dimension, and the thermoplastic may have a melt flow rate of at least 70 grams/10 minutes.

This invention may be implemented in many different ways. Here are some examples:

This invention may be implemented as a method of fabricating a 3D object, which 3D object comprises a plurality of substrate layers that are infiltrated by and bound together by a hardened material, the method comprising the following steps, in combination: (a) positioning powder on all or part of at least one of the layers; (b) repeating step (a) for remaining layers in the plurality of substrate layers; and (c) transforming at least some of the powder into a substance that flows and subsequently hardens into the hardened material, which hardened material is disposed in a spatial pattern that infiltrates at least one positive region in a set of the substrate layers and does not infiltrate at least one negative region in the set; wherein the powder is transformed in step (c) after being positioned in either step (a) or step (b), and wherein the substrate layers have at least one material property that is different than any material property of the hardened material. Furthermore: (1) the positioning may comprise selectively applying the powder to part but not all of a surface of the layer; (2) the positioning may be in accordance with a machine-readable digital model of a slice of the 3D object; (3) the transforming may comprise melting at least part of the powder; (4) the powder may comprise grains that each, respectively encapsulate a liquid, and the transforming may comprise rupturing, bursting or crushing at least some of the grains; and (5) the transforming may comprise a chemical reaction.

This invention may be implemented as a method of fabricating a 3D object, which 3D object comprises a plurality of layers and a hardened substance that binds the layers together, the method comprising the following steps, in combination: (a) selectively depositing powder on a positive region, but not on at least part of a negative region, of one of the layers; (b) repeating step (a) for remaining layers in the plurality of layers; (c) transforming at least some of the powder into matter that flows and subsequently becomes the hardened substance, which hardened substance is disposed in a spatial pattern that infiltrates the layers; and (d) removing material from at least one negative region of at least one substrate layer; wherein the powder is transformed in step (c) after being deposited in either step (a) or step (b), and wherein the substrate layers have at least one material property that is different than any material property of the hardened substance. Furthermore: (1) the selectively depositing powder on a positive region of the one of the layers may comprise a first substep and a second substep, the first substep comprising selectively depositing liquid on the positive region, and the second sub step comprising positioning the powder on or adjacent to the one of the layers to adhere the powder to the liquid; (3) the selectively depositing may further comprise a third substep, which third substep comprises removing powder that does not adhere to the liquid; and (4) the layers may comprise PET or PLA and an alkali, alone or together with one or more other substances, may be used for the removing This invention may be implemented as apparatus for fabricating a 3D object, which object comprises a plurality of layers and a hardened substance, the apparatus comprising, in combination: (a) an applicator, the applicator being configured for selectively depositing powder in at least some positive regions, but not in at least some negative regions, of at least some of the layers; and (b) a heating element, the heating element being configured for transforming the powder into matter that flows and then hardens into the hardened substance, which hardened substance binds the layers together and is disposed in a spatial pattern that infiltrates the layers; wherein the substrate layers have at least one material property that is different than any material property of the hardened substance. Furthermore: (1) the apparatus may further comprise an artificial pressure source, the pressure source being configured for applying pressure to one or more of the layers; (2) the pressure may be applied during softening of the powder; (3) the apparatus may further comprise one or more actuators, the one or more actuators being configured for translating one or more of the powder and the layers; (4) the apparatus may further comprise an additional actuator, the additional actuator being configured for translating the applicator into different positions while the applicator selectively deposits the powder; (5) the apparatus may further comprise a processor, the processor being configured for outputting control signals to control the applicator and heating element; (6) the processor may be adapted to output control signals to control the selectively depositing of powder for each of the at least some substrate layers, respectively, in accordance with digital data that specifies different slices, respectively, of the 3D object; and (7) the apparatus may further comprise a container, the container being configured for containing a liquid, which liquid includes a solvent or degrading material that is used for removing material from the at least some negative regions.

This invention may comprise apparatus for fabricating a 3D object, which object comprises a stack of substrate layers that have been infiltrated by a hardened material, the apparatus comprising, in combination: (a) an applicator, the applicator being configured for positioning powder on the layers; and (b) means for transforming the powder into a substance that flows and then hardens into the hardened material, which hardened material binds the layers together and is disposed in a spatial pattern that infiltrates at least one positive region in a set of the layers and does not infiltrate at least one negative region in the set; wherein the substrate layers have at least one material property that is different than any material property of the hardened substance. Such apparatus may additionally include a mechanism for folding two or more tiles on a substrate layer into a stack of substrate layer tiles.

This invention may comprise an article of manufacture comprising a plurality of layers that are infiltrated by and bound together by a hardened material, wherein the hardened material comprises either a thermoplastic or thermosettable plastic and exhibits a set of one or more characteristics, which set is sufficient for distinguishing the hardened material as having formed as a result of powder positioned on the layers, respectively, at least partially softening and then hardening. Furthermore: (1) the set of characteristics may comprise a pattern resulting from at least some grains of powder not completely softening; (2) the set of characteristics may comprise a pattern resulting from a first grain of powder flowing, after at least partially softening, more viscously than another grain of powder flows, after at least partially melting, or from part of the first grain flowing more viscously, after at least partially softening, than another part of the first grain flows, after partially softening; (3) the set of characteristics may comprise a crystalline or amorphous structure resulting from incomplete or nonhomogeneous melting of grains of powder; (4) the substrate layers may be woven; (5) the substrate layers may be woven and fibrous; (7) the substrate layers may be non-woven; and (8) the article may include more than one hardened material, each of which has a different shade or color.

This invention may be implemented as an article of manufacture comprising a stack of substrate layers that are infiltrated by a hardened material, wherein an exterior surface of the hardened material has a spatial resolution of 60 or more dots per centimeter in at least one dimension, and wherein the hardened material comprises a thermoplastic, which thermoplastic has an viscosity of 50 or more centipoise at 50 degrees centigrade above the thermoplastic's melting temperature.

This invention may be implemented as an article of manufacture comprising a plurality of substrate layers that are infiltrated by and bound together by a hardened material, wherein an exterior surface of the hardened material has a spatial resolution of 170 or less microns in at least one dimension, and wherein the hardened material comprises a thermoplastic, which thermoplastic has a melt flow rate of at least 70 grams/10 minutes.

This invention may be implemented as a process for fabricating a 3D object, which process comprises, in combination: (a) depositing thermosettable or thermoplastic powder on a second layer of substrate, in a pattern, for each substrate layer, respectively, defined by a digital description of a slice or section of a 3D object, (b) positioning the second layer of the substrate adjacent to a first layer of substrate so that edges of the first and second substrate layers are aligned and so that powder that was deposited on the second layer is between the first and second layers, (c) repeating step a with respect to a third layer of substrate, (d) positioning the third layer substrate adjacent to the second layer so that edges of the second and third layers are aligned and so that powder that was deposited on the third layer is between the second and third layers, (e) repeating steps (c) and (d), layer by layer, until powder has been selectively deposited on substrate layers corresponding to all of the layers of the 3D object, (f) applying sufficient heat and pressure to at least two of these substrate layers to (1) cause at least a portion of the deposited powder to melt or soften, and (2) cause that melted or softened powder to coat at least a portion of the substrate layers, (g) allowing the melted or softened powder to cool, so that, upon cooling, the resulting thermoplastic or thermoset material binds together at least two substrate layers, which two layers are adjacent to each other, and (h) removing a portion of the substrate layers, which portion is not coated by the resulting thermoplastic or thermoset material. Depending on the particular implementation of this process, each of steps (f), (g) and (h) may occur either once, or more than once, during the process. For example, steps (f), (g) and (h) may occur once per layer, or once every five layers.

This invention may be implemented as a process for fabricating a 3D object, which process comprises, in combination: (a) depositing thermosettable or thermoplastic powder on two or more tiles defined on a layer of substrate, in a pattern, for each tile of the substrate layer, respectively, defined by a digital description of a slice or section of a 3D object, (b) folding the tiles of the substrate along a common edge between each two adjacent tiles on the substrate so that powder that was deposited on a tile is aligned with powder that was deposited on at least one adjacent tile, (c) repeating steps a and b with respect to a second or more layers of substrate if needed, (d) adding the stack or stacks of tiles formed in step c to the stack of tiles formed in step b, (e) applying sufficient heat and pressure to the stack of substrate layers to (1) cause at least a portion of the deposited powder to melt or soften, and (2) cause that melted or softened powder to coat at least a portion of the substrate layers, (f) allowing the melted or softened powder to cool, so that, upon cooling, the resulting thermoplastic or thermoset material binds together at least two substrate layers, which two layers are adjacent to each other, and (g) removing a portion of the substrate layers, which portion is not coated by the resulting thermoplastic or thermoset material. Depending on the particular implementation of this process, each of steps (e), (f) and (g) may occur either once, or more than once, during the process. For example, steps (e), (f) and (g) may occur once per stacked tiles of a single substrate layer, or once every two or more stacks of tiles from substrate layers.

This invention may also be implemented as a process for fabricating a 3D object, which process comprises, in combination: (a) depositing thermosettable or thermoplastic powder on two or more tiles defined on a length of substrate, in a pattern, for each tile of the substrate layer, respectively, defined by a digital description of a slice or section of a 3D object, (b) folding the tiles of the substrate along a common edge between each two adjacent tiles on the substrate so that powder that was deposited on a tile is aligned with powder that was deposited on at least one adjacent tile, (c) applying sufficient heat and pressure to the stack of substrate layers to (1) cause at least a portion of the deposited powder to melt or soften, and (2) cause that melted or softened powder to coat at least a portion of the substrate layers, (d) allowing the melted or softened powder to cool, so that, upon cooling, the resulting thermoplastic or thermoset material binds together at least two substrate layers, which two layers are adjacent to each other, and (e) removing a portion of the substrate layers, which portion is not coated by the resulting thermoplastic or thermoset material. Depending on the particular implementation of this process, each of steps (c), (d) and (h) may occur either once, or more than once, during the process. For example, steps (c), (d) and (e) may occur once per every two stacked tiles, or once every three or more stacked tiles from the length of substrate.

This invention may also be implemented as a process for fabricating a 3D object, which process comprises, in combination: (a) depositing thermosettable or thermoplastic powder on two or more tiles defined on a length of substrate, in a pattern, for each tile of the substrate layer, respectively, defined by a digital description of a slice or section of a 3D object, (b) rolling up the two or more tiles as and until all of the tiles for fabricating the 3D object are powdered per step (a); (c) unrolling the two or more tiles and folding the tiles of the substrate along a common edge between each two adjacent tiles on the substrate so that powder that was deposited on a tile is aligned with powder that was deposited on at least one adjacent tile, (d) applying sufficient heat and pressure to the stack of substrate layers to (1) cause at least a portion of the deposited powder to melt or soften, and (2) cause that melted or softened powder to coat at least a portion of the substrate layers, (e) allowing the melted or softened powder to cool, so that, upon cooling, the resulting thermoplastic or thermoset material binds together at least two substrate layers, which two layers are adjacent to each other, and (f) removing a portion of the substrate layers, which portion is not coated by the resulting thermoplastic or thermoset material. Depending on the particular implementation of this process, each of steps (c), (d), (e) and (f) may occur either once, or more than once, during the process. For example, steps (c), (d), (e) and (f) may occur once per every two stacked tiles, or once every three or more stacked tiles from the length of substrate.

This invention may also be implemented as a product produced by any of the processes described in the preceding paragraphs.

This invention may be implemented as an article of manufacture, comprising at least twenty layers of substrate, each layer being bound to at least one adjacent layer by (and at least partially coated by) a material that comprises a thermoplastic or thermosettable polymer. Furthermore, depending on the particular embodiment of this article of manufacture: (1) the substrate layer may be woven, (2) the substrate layer may be woven and fibrous, (3) the substrate layer may be non-woven, (4) the substrate layer may be non-fibrous, (5) at least a portion of the external, macroscopic geometry of the substrate may be polyhedral in shape, (6) the macroscopic exterior of the article of manufacture may include multiple rectilinear faces in different planes, (7) the macroscopic exterior of the article of manufacture may define multiple compound or complex curves, (8) substrate layers of such article may be coated at least in part with a repellant or sizing, (9) different portions of the polymer may have different colors, and (10) the polymer may cover fibers in substrate layers. Each layer can be planar or flat.

This invention may be implemented as apparatus comprising, in combination: (a) at least one applicator for depositing thermoplastic or thermosettable powder on multiple layers of substrate, in a pattern, for each substrate layer, respectively, defined by a digital description of a slice or section of a 3D object, (b) at least one heat source for applying heat to the substrate layers, (c) at least one pressure source for applying pressure to the substrate layers, and (d) one or more computer processors for (I) accepting and processing digital data describing a section or slice of a 3d object, and (II) outputting control signals for controlling the operation of the applicators. The apparatus may further comprise one or more of the following: (1) a container for containing a liquid, which liquid includes a solvent or degrading material that is used for removing excess substrate, the excess substrate being that portion of the substrate that is not coated by thermoplastic or thermoset material after it melts or softens and then cools, (2) a heat source for heating the liquid solvent or degrading material, and (3) one or more actuators for translating one or more of the powder, substrate sheets and the finished or partially finished 3D object. Also, depending on the particular embodiment of this article of manufacture, the one or more computer processors may do one or more of the following: (1) accept and process data from one or more sensors, such as heat or pressure sensors, or sensors for determining whether and to what extent adjacent substrate layers are aligned, (2) control the at least one heat source, (3) control the at least one pressure source, (4) control the one or more actuators, and (5) accept data indicative of input from a human user.

In another aspect, this invention comprises a 3D object fabricated using any of the fabrication techniques described above. For example, such a 3D object may be comprised of composite materials. These composite materials may comprise substrate layers coated by solidified thermoplastic or thermoset polymer.

Figure 15:
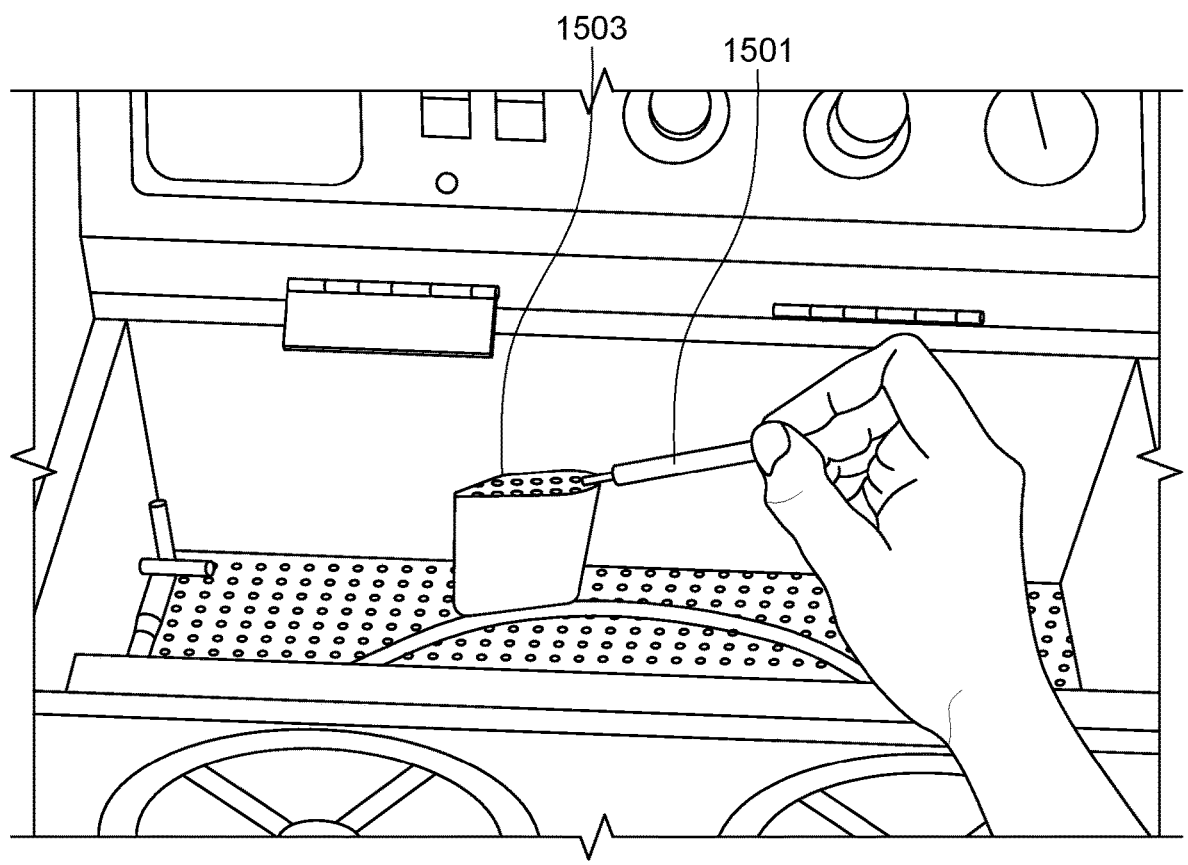
FIG. 15 shows part of an abrasive blasting apparatus as it starts to abrade the excess region from a stack of carbon fiber layers.

FIG. 15 shows part of an abrasive blasting apparatus 1501, as it starts to abrade the excess region from a stack 1503 of carbon fiber layers. In FIG. 15, the abrasive blasting has not yet removed any of the excess region. The stack 1503 of layers had been fused together when thermosetting or thermoplastic powder hardened.

Figure 16:
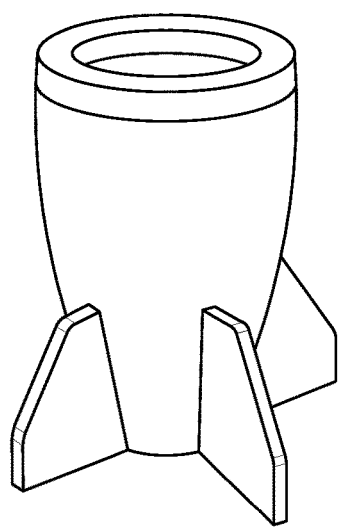
FIG. 16 is a photograph of a 3D object, comprising a carbon fiber composite material, which was fabricated by a prototype of this invention.

FIG. 16 is a photograph of a 3D object, comprising a carbon fiber composite material, which was fabricated by a prototype of this invention. FIG. 16 is a photograph of a vase, after excess regions in the stack of carbon fiber layers have been removed by abrasion. The remaining portion of the stack corresponds to the vase shape of the target 3D object. The excess regions that were removed were weaker (more fragile or friable) and were easier to abrade than the printed portion, because no thermosetting resin or thermoplastic powder hardened on the excess regions.

In exemplary implementations of this invention, multiple "slices" of a desired 3D object may be printed on a single sheet. Slices from multiple sheets may be used to fabricate the desired 3D object. The slices may be cut from the sheet and stacked individually, or folded into a stack. Alternatively, multiple "slices" of a desired 3D object may be printed on a single length of substrate material. The slices may be cut from the sheet and stacked individually, or folded into a stack.

Figure 17A:
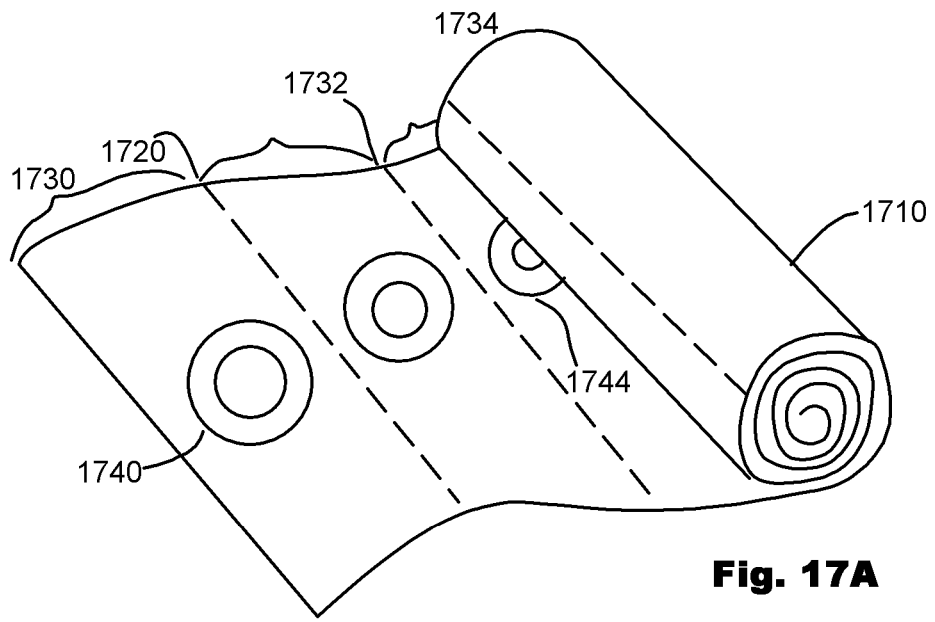
FIGS. 17A-B depict an alternate embodiment in which a roll is perforated every X inches, printed, powdered, and then folded accordion-style.
Figure 17B:
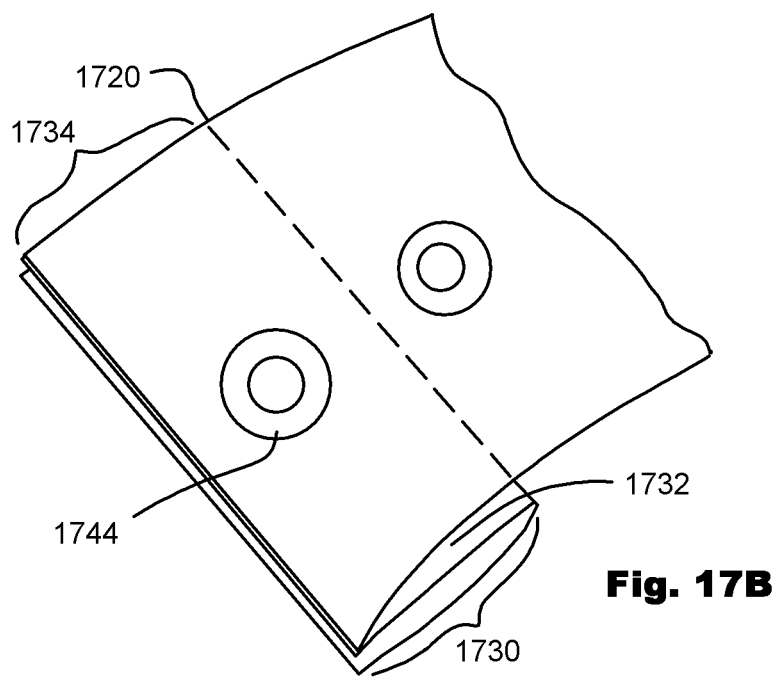

In an alternative embodiment to that depicted in FIGS. 7B-D, a roll 1710 of substrate material can be perforated 1720 along its width at intervals of equal length, as shown in FIG. 17A. The portion 1730, 1732, 1734 of the roll between each two perforations 1720 defines a tile on which a slice 1740, 1742, 1744 of the object is printed. After the powder has been applied to a tile in the manner described above, the tile 1732 can be folded onto the previously powdered tile 1730 in an accordion or fan-like fashion, as shown in FIG. 17B. Alternatively, the printed and powered tiles can be rolled up until all of the tiles on the roll have been printed and powdered. Then, after all of the tiles for the part are completed, they can be unrolled and fan-folded. In this perforated roll embodiment, the slices of the 3D object printed onto the tiles are again arranged in sequence and oriented so that, when the tiles are folded, they are located in the right place and orientation in the stack of tiles.

Illustrative Implementation Using Thermoplastic Polymer Powder

In an illustrative implementation of this invention, a composite 3D object is produced as follows:
1. Cut nonwoven carbon fiber substrate layer on laser cutter. Cut registration holes into the layer. The substrate can be cut in advance of the rest of the process.
2. Put nonwoven substrate layer on registration post of printer.
3. "Print" a slice. (In this step, liquid is selectively applied to the carbon fiber substrate layer, e.g., by inkjet printing).
4. Remove carbon fiber substrate layer from printer.
5. Flood carbon fiber substrate layer with thermoplastic powder. The powder adheres or "sticks" to the substrate only where the liquid was applied.
6. Remove excess powder by turning carbon fiber substrate layer over and shaking until excess powder it falls off.
7. Remove any remaining excess powder with a stream of compressed air.
8. Place carbon fiber substrate on a heated surface (e.g., a hot griddle or other heating element) and melt the powder that adhered to the printing liquid. Preferably, the heated surface has been previously treated with polytetrafluoroethylene, so that the carbon fiber substrate does not stick to the heated surface. Alternatively, a layer of another material may be interposed between the heated surface and the carbon fiber substrate, to prevent sticking
9. Place the printed carbon fiber substrate on a fixture using registration holes to align.
10. Return to step 2 until all layers have been printed and placed on the fixture, creating a stack of printed carbon fiber/polymer powder layers
11. Place the stack into a compression device. Then use the compression device to apply pressure to the stack. The compression device may include, for example (1) springs for applying compression; and (2) bolts or standoffs for limiting the amount that the substrate layers are compressed.
12. Preheat oven.
13. Put compression device (with stack of carbon fiber layers in it) in oven.
14. Heat the compression device (with the carbon fiber layers in it) for appropriate time.
15. Remove compression device from oven.
16. Let compression device cool to room temperature.
17. Open up the compression device (e.g., in some cases, by unscrewing nuts).
18. Remove fused 3D object from the compression device.
19. Remove the excess region of each substrate layer by abrasive blasting. The excess region is the portion of the substrate layer that was not covered or permeated by the melted thermoplastic material.

In exemplary implementations of this invention, a composite 3D object is produced, layer by layer, using carbon fiber substrate layers. A CAD model of the desired 3D object is produced first. Then a software program (e.g., a Netfabb® program) slices the CAD model into slices of correct thickness, and produces bitmaps for each layer.

A non-woven carbon fiber substrate may be used. Alternatively, woven or chopped carbon fiber substrate may be used.

An applicator may selectively deposit liquid on each carbon fiber substrate layer, respectively. In some implementations of this invention, the applicator may comprise, for example, an inkjet head. The inkjet head may be housed in an inkjet printer. Alternatively, the inkjet head may be affixed to another device that is configured to position the inkjet head for printing, e.g., by rastering or moving the inkjet head to a particular (x,y) position over the carbon fiber layer. The inkjet head may be a thermal head or, alternatively, any other type of inkjet head, including a piezoelectric head.

The applicator may move over the carbon fiber substrate layer. As it does so, the applicator may "print" a swath of the bitmap onto the carbon fiber by selectively depositing liquid onto the carbon fiber. A wide variety of fluids may be deposited by the applicator. For example, conventional inkjet ink may be used. Alternatively, the fluid in the applicator may be a mixture of distilled water and 2-Pyrrolidone. For example, the mixture may comprise 10% to 50% 2-Pyrrolidone, and the rest distilled water. The mixture (of distilled water and 2-Pyrrolidone) may be used for the purpose of reducing the evaporation rate of the fluid from the carbon fiber. Other fluids (e.g., glycols) can be used for this purpose.

In a prototype of this invention, the applicator comprises an HP45A inkjet cartridge (available from Hewlett-Packard Company).

The carbon fiber layer may then be removed from the apparatus where the liquid was dispensed. The carbon fiber layer may then promptly, so that the liquid does not evaporate, be flooded with nylon powder. For example, the nylon powder may have an average grain size in the range of 50 to 100 microns. Alternatively, other polymer powders such as polyethylene or PEEK (polyether ether ketone) can be used. Advantageously, PEEK is a high performance resin.

Powder adheres where the liquid was deposited by the inkjet head. The excess powder (which did not adhere to the deposited liquid) can be removed by shaking the substrate layer upside down and then blowing it with an air hose. This removes the excess powder that may have been trapped in the crevices of the substrate layer. The carbon fiber layer may be placed on a heated surface (e.g., a griddle) or placed adjacent to any heating element. The heat melts and thus better attaches the remaining polymer powder so that the remaining powder tends not to be displaced in further handling.

Each of the sheets of carbon fiber, or multiple tiles on each sheet of carbon fiber that are folded into a stack, or multiple tiles on a length of carbon fiber folded into a stack, may then be placed on four registration posts in a compressive device. The process above (print on substrate layer, then put substrate layer on the registration posts) may be repeated until all of the carbon fiber layers have been "printed" with thermoplastic powder and placed on the registration posts of the compressive device. The compressive device may include one or more plates, springs, nuts and bolts to apply pressure to the stack of carbon fiber layers. The pressure may compress the stack. The compressive device may be configured to apply a constant amount of pressure even as the dimensions of the stack change under heat and pressure. A standoff, separator or other mechanical component (e.g., a nut) can be used to maintain a minimum distance past which the stack of carbon fiber layers cannot be compressed.

The compressive device is placed in an oven. The time spent in the oven and the temperature of the oven may be chosen depending on the size of the desired object. The heating causes the layers to fuse together. As the powder melts, it covers the fibers. The compressive device is later cooled and the molten material hardens. After that, bolts holding the plates are loosened and the stack of layers is removed from the compressive device.

Abrasion may be used to remove excess regions of carbon fiber layers (where the melted powder did not coat or infiltrate). Carbon fiber is quite fragile in bending and can be abraded. However, the portion of the substrate layer which has been impregnated with the thermoplastic or thermoset material is quite hard and stiff and resistant to abrasion. The largest portion of the excess region may be removed by scraping with a dental tool. Also, for many geometries, the final removal can be done with a wire brush. In addition, abrasive blasting can be used to remove the uncoated carbon fiber. Additionally, abrasive blasting can clear internal channels in the 3D object.

After removing the excess region, the result is a stiff 3D printed carbon fiber composite of nearly arbitrary geometry. This fiber composite is fabricated without the use of tooling and in accordance with a CAD model.

If woven fabric is used, then the orientation of the carbon fiber fabric can be adjusted and the weave of the fabric changed so that layers may have different orientations to give the part greater strength in various directions.

In exemplary implementations of this invention, no mold design is required. Thus, each part can be different and customized. So for example door panels of cars can be made which are customized by and for the customer. In contrast, in conventional car manufacturing: car panels are stamped out of metal; tooling costs can be extremely high; the costs of the presses can be large; and the time to produce the tooling can be long. In exemplary implementations, the present invention can overcome all of these problems.

In some implementations, a composite material including carbon fiber is produced. The composite material may exhibit desirable electrical characteristics. For example, if the carbon fibers in the composite are continuous, the composite may exhibit appreciable electrical conductivity.

Ferrite particles or other materials can be included with the resin or powder to reduce the radar signature of the part for use in stealth aircraft and other radar avoiding devices.

Alternatively, other types of substrates may be used, including other fabrics that have similar properties. For example, other substrate materials that can be abraded or abrasively blasted (such as fiberglass, ceramics, or polymers such as certain polyesters) may be used.

In some implementations of this invention, all of the steps are automated.

In some implementations of this invention, multiple "slices" are "printed" on each substrate layer. For example, for a 3D object that comprises 144 slices, 12 substrate layers may be used, and 12 slices may be printed per substrate layer. In this case, particularly if the entire process is automated, it may be preferable to print, on the first sheet, slices 1, 13, 25, . . . 133, on the next sheet, slices 2, 14, 26, . . . 134, and so on. That way, for example, the upper right slice on sheets 1 to 12 may comprise a signature of slices 1 to 12; an upper middle slice on sheets 1 to 12 may comprise a signature of slices 13 to 24, and so on. In this example, the 144 slices may be cut and stacked initially into 12 signatures, and the 12 signatures may then be stacked together in order (e.g., on registration posts in a compressive device).

In some implementations of this invention, no powder is used. A thermosetting liquid or a thermoplastic liquid may be selectively applied to a carbon fiber substrate. The liquid penetrates or coats a region of the carbon fiber substrate. When the liquid later cures or hardens in that region, it produces an extremely stiff carbon fiber composite material. This also acts to bond the layers together and pressure may be used to create a better bond and also to compress the substrate. In a region of the substrate where no liquid is applied (an excess region), the carbon fiber remains friable. The excess region is removed by abrasive blasting.

In implementations in which no powder is used, the liquid that is applied may comprise for example: uncured epoxy resin, uncured acrylic resin, or UV curable resin. For example, low melting point, low viscosity polyethylene may be used with inkjet heads.

In some implementations, cut up carbon fiber is used. The cut up carbon fiber may be saturated, coated or infiltrated by a liquid thermosetting polymer or liquid thermoplastic. For example, the liquid may comprise an epoxy resin or acrylic resin. In either case, the resin (or other liquid) can penetrate or coat the cut up carbon fiber fabric, and then cure.

Alternatively, in some implementations, different materials may be used in different layers. For example, in an illustrative implementation, some of the layers may comprise carbon fiber and other layers may comprise other materials, such as polyester. Or, for example, fibers may be oriented in different directions in different layers. Or, for example, different thermosetting or thermoplastic material may be selectively applied, in different substrate layers.

A wide variety of registration/alignment techniques may be used in this invention.

For example, registration holes and posts may be employed for registration. For example, each carbon fiber substrate layer may be cut so that it has four registration holes, one hole on each corner. This can be done with a laser cutter. Or, for example, a rim for each registration hole may be printed, and then a hole in the middle of the rim may be poked out or otherwise removed.

After being printed, the carbon fiber substrate layer may be placed on a set of four registration pins (so that the four registration pins penetrate the four registration holes).

In another example, tiles defined on a substrate layer can be folded into a stack of layers, or tiles defined on a length of substrate can be folded into a stack of layers. This can be done alone, or in combination with the use of registration holes and posts, or with any of the many other alignment mechanisms known in the art of the invention.

Or, for example, self-alignment may be employed. If an applicator (e.g., inkjet printer) is configured to always print within the exact same region, this fact can be exploited to achieve self-alignment. For example, a bottom substrate layer may be held firmly in place on a flatbed printer. Thermoplastic or thermosetting polymer may be selectively applied to the layer by an applicator (e.g., an inkjet cartridge). Another substrate layer may be added. Then the thermoplastic or thermosetting polymer (which was applied to the bottom layer) may be heated and then cooled (or pressed or mixed with a curing agent or other otherwise cured). A hardened or cured material then results, which fuses the first and second layers. This process may be repeated, layer by layer. In this example, the substrate layers are self-aligned, because (i) the printer always prints within the exact same region, and (ii) the bottom layer is held firmly in place.

The order in which steps occur may vary. For example, heat or pressure or both may be applied once for each layer, for at least most of the layers. Or, for example, heat or pressure or both may be applied less frequently, such as (1) only once every t layers, where t is an integer greater than one, or (2) only once at all, after the thermosetting or thermoplastic material is selectively applied to each of the substrate layers and all of the substrate layers have been positioned in a stack.

Or, for example, liquid may be selectively applied for just one "slice" of the 3D object, then that "slice" may be flooded with powder, then the excess powder for that slice may be removed, and then the process may be repeated for the next step, and so on, layer by layer.

Or, for example, liquid may be selectively applied to print a group of "slices" on a single sheet of the 3D object. Then the whole group of slices on that single sheet may be flooded with powder, then the excess powder for that group of slices may be removed, and then the process may be repeated for the next group of slices, and so on, group by group.

In some implementations of this invention, a powder may comprise a mixture that includes microencapsulated thermosetting resin and a powder based hardener. As discussed above, the powder mixture may be selectively applied (including by first selectively applying fluid to a substrate, and then flooding the substrate with powder so that powder adheres to the liquid, and then removing the excess loose powder). The powder mixture may then be crushed, so that the microcapsules burst or leak, the thermosetting polymer and curing agent mix, and the thermosetting polymer is cured. The cured material may infiltrate or coat a portion of each substrate layer, respectively, and the excess portion of each substrate layer may be removed, e.g. by abrasive blasting.

This invention may also be implemented as a 3D composite object fabricated by a 3D printer. Such a 3D object may comprise layers of carbon fiber substrate that were fused together by thermoplastic or a thermoset. In some cases, the hardened material in the 3D object may have characteristics indicative of the fact that the thermoplastic plastic was in powder form immediately before melting, including partial melting. In some cases, the hardened material in the 3D object may have characteristics indicative of the fact that pressure was applied to burst a powder mixture that includes microencapsulated thermosetting polymer and power based hardener. In some cases, the carbon fiber may be arranged in the 3D object in a pattern indicative of the fact that, before the thermoset or thermoplastic hardened, the carbon fibers were cut up, were loose, or otherwise did not comprise entire, integral sheets of carbon fiber. In some cases, some substrate layers in the 3D object may comprise carbon fiber and other substrate layers in the 3D object may comprise another material. In some cases, the orientation or weave characteristics of the carbon fiber substrate in the 3D object may vary from layer to layer. In some cases, the hardened thermoplastic or thermoset material may contain chemicals or other characteristics indicative of the fact that the material, before it hardened, was ejected by an inkjet cartridge or inkjet head, or by some other particular type of applicator.

According to principles of this invention, abrasive blasting may be used to remove material in a wide range of 3D printing technologies, including fused deposition. Abrasive blasting has the advantage of being faster than many other subtractive techniques.

In exemplary implementations, the hardware of this invention may include any one or more of the following components, together or in combination: (1) applicators, including applicators for selectively applying liquid to substrate layers, (2) positioning apparatus, including positioning apparatus for rastering or otherwise moving an applicator when selectively depositing liquid or powder, (3) vessels, containers, bins, pipes, hoses or other channels for storing or moving materials used in fabricating a 3D object, including vessels, containers, bins, pipes, hoses or other channels for storing or moving any thermoplastic, thermosetting polymer, curing agent, or other raw or intermediate material used in fabrication, and including vessels, containers, bins, pipes, hoses or other channels for storing or moving any fluids, including compressed gas, used in abrasive blasting or any other manufacturing step, (4) substrate manipulators, including substrate manipulators for shaking, rotating, translating, vibrating or vacuuming substrate layers, (5) heating or compressive apparatus, including heating or compressive apparatus for heating or compressing stacks of one or more substrate layers, and including heating elements, (6) subtractive manufacturing apparatus, including abrasive blasting apparatus, bristle blasting apparatus, abrasion apparatus, rotary brushes, wire brushes, sandpaper, emery paper, belts, sanders, files, saws, drills, burrs, awls, scrapers, scalers, or curettes, and further including any of the foregoing configured for removing excess regions of substrate or removing raw materials or intermediate materials employed in fabrication, including abrasive blasting apparatus for abrading excess regions of substrate layers, (7) actuators (including motors, engines transmissions, power trains, pumps, fans or robotics) for actuating motion of any the hardware described above or for actuating motion of any material (including powder, or any material in any phase, including solid, liquid, gas) used in fabricating a 3D object, (8) additive manufacturing apparatus of any kind, (9) electronic devices, including electronic memory devices, and (10) processors, including processors for generating CAD models of target 3D objects, producing slices and bitmaps, outputting control signals to control the other hardware described above, receiving signals indicative of human input, outputting signals for controlling output of information in human perceivable form, and reading data from, and writing data to, one or more electronic memory devices. Just to be clear, the components in the preceding sentence are neither human nor part of a human body.

Alternatively, in some implementations of this invention in which powder is employed, the powder may be deposited using a selective deposition technique similar to that employed in xerographic printing. In this approach, an electrical charge is imparted to powder particles, which are directed toward the substrate layer, and then selectively adhere to some portions of the substrate but not others, due to electrostatic attraction or repulsion. The powder particles adhere to portions of the substrate that have an opposite electrical charge (or that are adjacent to a surface that has such a charge), and are repelled from portions of the substrate that have the same electrical charge (or that are adjacent to a surface that has such a charge).

Alternatively, in some implementations of this invention in which powder is employed, the powder may be deposited using a selective deposition technique similar to that employed in magnetographic printing. In this approach, powder selectively adheres to some portions of the substrate layer, but not others, due to magnetostatic interactions between the powder and the substrate layer (or a surface adjacent to the substrate layer). For example, the powder may be a single component magnetic toner, or may comprise a colloidal suspension (e.g., a ferrofluid) or may be a dual component toner. A variety of magnetic pigments, such as magnetite ($Fe_3O_4$) or ferric oxide (($Fe_2O_3$), may be used for the toner in this approach.

As used herein, the following terms expressly mean:

The terms "a" and "an", when modifying a noun, do not imply that only one of the noun exists.

An "applicator" means a device for applying a substance to a surface, or otherwise depositing, dispensing or moving the substance. For example, the substance may be a powder or a liquid. For example, an applicator may comprise an inkjet head.

The word "coat" means to (at least partially) coat, infiltrate, penetrate or encapsulate. Grammatical variations of "coat" shall be construed accordingly. To coat a substrate means to coat the substrate or substructures of the substrate (such as threads, short fibers, long fibers, whiskers, spherical particles, ellipsoidal particles, flakes, small platelets, small ribbons, particulates of any other shape).

The term "comprise" means include without limitation. If A "comprises" X and Y, this does not mean that A consists solely of X and Y. Instead, it means that A consists of at least X and Y.

The phrase "harden into" does not imply or exclude any displacement, translation or other movement.

A "heating element" means an artificial heat source that heats by one or more of conduction, convection, radiation or induction. A "heating element" includes, among other things: (1) a resistor or any other resistive heating element; (2) any other device that converts electricity into heat by ohmic heating; (3) a hot stamp press or any other apparatus for applying heat and pressure; (4) an oven; (5) an inductive heater; and (6) an artificial source of electromagnetic radiation, including a heat lamp, an artificial infrared light source, a laser, or an artificial source of microwave radiation.

The fact that an "example" or multiple examples of something are given does not imply that they are the only instances of that thing. An example (or a group of examples) is merely a non-exhaustive and non-limiting illustration.

The terms "include", "includes", "including" shall be construed broadly, as if followed by the words "without limitation".

To "infiltrate" a layer includes (a) to infiltrate or penetrate into the interior of the layer and to at least partially cover at least some interior substructures of the layer (or of the region); (b) to be absorbed into the layer, or (c) to be arranged in a pattern that results from infiltrating as described in (a) or (b). For example, a spatial pattern "infiltrates" a layer if the pattern results from infiltrating as described in (a) or (b). Also, for example, a hardened material "infiltrates" a layer if the hardened material is arranged in a pattern that results from infiltrating as described in (a) or (b). To infiltrate a region of a layer shall be construed in like manner as to infiltrate a layer. Unless the context requires otherwise, if a substance x "infiltrates" substance y, this implies that x has at least one material property that is different than any material property of y.

To "melt" includes (1) to melt or soften by the application of heat and (2) to dissolve.

A "negative" region of a substrate layer, which layer is used in fabricating a 3D object, means a region that is not (or will not be) included in the 3D object when fabrication of the 3D object is complete.

The term "or" is an inclusive disjunctive. For example "A or B" is true if A is true, or B is true, or both A or B are true.

A "positive" region of a substrate layer, which layer is used in fabricating a 3D object, means a region that is (or will be) included in the 3D object when fabrication of the 3D object is complete.

The term "powder" includes (1) a material comprising entirely solid grains, (2) a material comprising at least some grains that each, respectively, encapsulate a liquid, (3) any granular material, and (4) a material comprising solid particles that may flow, relative to each other, when accelerated.

A "set" consists of one or more elements. The term "set" does not include an empty set with no elements.

To "soften" includes (1) to soften below a melting temperature and above a glass transition temperature, (2) to melt above a melting temperature, (3) to transition from a higher to a lower elastic modulus, (4) to transition from a higher to a lower viscosity, or (5) to otherwise soften. The adjective "soft" shall also be construed in like manner. For example, the adjectives "soft" and "softened" each include "melted".

A list of multiple steps in a process does not imply, except to the extent that the context requires otherwise, that: (1) the steps occur in any particular order or sequence, including the order or sequence listed; (2) the steps occur only once; (3) the different steps occur the same number of times during the process, or (4) a particular step is applied to the same thing each time that the particular step occurs (for example, except to the extent that the context requires otherwise, a specific step that is described as applying to "a layer" may apply to a different layer each time that this specific step occurs). For purposes of this grammatical paragraph, "list" includes "description" or "describe".

"3D" Means Three-Dimensional.

Grammatical variations of defined terms shall be construed in like manner as the defined terms. For example, if a verb is defined in one conjugation, then other conjugations of that verb shall be construed in like manner. Or, for example, if a noun is defined in one declension, then other declensions of that noun shall be construed in like manner. Or for example, the noun "infiltration" shall be construed in like manner as the defined verb "infiltrate". Or, for example, the adjective "softened" shall be construed in like manner as the defined verb "soften".

While a preferred embodiment is disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

The invention claimed is:

1. A method of fabricating a three-dimensional object, comprising the steps of:
   printing sequential cross-sections of the three-dimensional object with a liquid as a set of side-by-side tiles on a master substrate layer, wherein the master substrate layer is a sheet-like structure that is substantially planar or flat;
   placing powder on the master substrate layer covering the tiles, wherein the powder adheres to printed areas on the tiles;
   removing excess powder;
   folding the tiles on the master substrate layer to form a stack of cross-sections of the three-dimensional object;
   transforming at least some of the powder in the stack into a substance that flows and subsequently hardens into hardened material, thereby binding the plurality of folded tiles together, wherein the hardened material is disposed in a spatial pattern representing the three-dimensional object.

2. The method of claim 1 wherein said transforming is fusing.

3. The method of claim 1, further comprising removing at least some of the negative regions from the stack.

4. The method of claim 3, wherein said removing is performed at least in part by mechanical abrasion.

5. The method of claim 1, further comprising aligning the folded tiles in a predetermined manner before said transforming using an alignment mechanism.

6. The method of claim 1, wherein the master substrate layer is composed of materials selected from the group consisting of carbon fibers, ceramic fibers, polymer fibers, glass fibers, and metal fibers.

7. The method of claim 1 wherein the powder is a thermoplastic.

8. A method of fabricating a three-dimensional object, comprising the steps of:
   applying liquid on all or part of at least one of a plurality of substantially flat substrate layers, wherein each substrate layer is a side-by-side tile on a master sheet;
   positioning powder on at least part of at least one of the plurality of substrate layers, wherein at least some of the powder adheres to the previously applied liquid;
   removing excess powder;
   folding the substrate layers on the master sheet in a predetermined order for creating the three-dimensional object; and
   transforming at least some of the powder into a substance that flows and subsequently hardens into a hardened material, thereby binding the plurality of substrate layers together, wherein the hardened material is disposed in a spatial pattern that infiltrates or coats at least one positive region in the plurality of substrate layers and does not substantially infiltrate or coat at least one negative region in the plurality of substrate layers, the three-dimensional object comprising the positive regions of the stacked plurality of substrate layers that are infiltrated.

9. The method of claim 8, further comprising the step of:
   removing at least some of the negative regions from the stacked substrate layers to form the three-dimensional object.

10. The method of claim 8, wherein said removing is performed at least in part by mechanical abrasion.

11. The method of claim 8, further comprising the step of:
   aligning the folded substrate layers in a predetermined manner for creating the three-dimensional object, wherein the folded substrate layers are accurately aligned within the stack by an alignment mechanism.

12. The method of claim 8, wherein the substrate layers are composed of materials selected from the group consisting of carbon fibers, ceramic fibers, polymer fibers, glass fibers, and metal fibers.

* * * * *